(12) United States Patent
Lesswing et al.

(10) Patent No.: US 8,407,071 B2
(45) Date of Patent: Mar. 26, 2013

(54) METHOD AND APPARATUS FOR REPRICING A REIMBURSEMENT CLAIM AGAINST A CONTRACT

(75) Inventors: Mark Lesswing, St. Charles, IL (US); Dale Hoerle, Lisle, IL (US)

(73) Assignee: The TriZetto Group, Inc., Greenwood Village, CO (US)

( * ) Notice: Subject to any disclaimer, the term of this patent is extended or adjusted under 35 U.S.C. 154(b) by 0 days.

(21) Appl. No.: 13/352,960

(22) Filed: Jan. 18, 2012

(65) Prior Publication Data
US 2012/0130754 A1    May 24, 2012

Related U.S. Application Data

(62) Division of application No. 12/975,647, filed on Dec. 22, 2010, now Pat. No. 8,160,905, which is a division of application No. 09/577,386, filed on May 23, 2000, now Pat. No. 7,904,317.

(60) Provisional application No. 60/159,306, filed on Oct. 14, 1999.

(51) Int. Cl.
*G06Q 40/08* (2012.01)

(52) U.S. Cl. .................. 705/4; 705/2; 705/36 R; 705/37; 709/204

(58) Field of Classification Search ............... 705/4, 2, 705/36 R, 37
See application file for complete search history.

(56) References Cited

U.S. PATENT DOCUMENTS

| | | | |
|---|---|---|---|
| 4,491,725 A | 1/1985 | Pritchard | 705/2 |
| 4,858,121 A | 8/1989 | Barber et al. | 705/2 |
| 4,916,611 A | 4/1990 | Doyle, Jr. et al. | 705/2 |
| 5,134,564 A | 7/1992 | Dunn et al. | 705/33 |
| 5,191,522 A | 3/1993 | Bosco et al. | 705/4 |
| 5,235,507 A | 8/1993 | Sackler et al. | 705/2 |
| 5,253,164 A | 10/1993 | Holloway et al. | 705/2 |
| 5,301,105 A | 4/1994 | Cummings, Jr. | 705/2 |
| 5,324,077 A | 6/1994 | Kessler et al. | 283/54 |
| 5,333,317 A | 7/1994 | Dann | 1/1 |
| 5,339,434 A | 8/1994 | Rusis | 709/246 |
| 5,359,509 A | 10/1994 | Little et al. | 705/2 |
| 5,410,675 A | 4/1995 | Shreve et al. | 710/65 |
| 5,471,382 A | 11/1995 | Tallman et al. | 600/300 |
| 5,493,671 A | 2/1996 | Pitt et al. | 1/1 |
| 5,517,405 A | 5/1996 | McAndrew et al. | 706/45 |
| 5,539,787 A | 7/1996 | Nakano et al. | 375/377 |
| 5,544,044 A | 8/1996 | Leatherman | 705/3 |
| 5,581,558 A | 12/1996 | Horney, II et al. | 370/401 |

(Continued)

FOREIGN PATENT DOCUMENTS

| | | |
|---|---|---|
| DE | 19641357 | 9/1998 |
| JP | 11242270 | 9/1999 |

(Continued)

OTHER PUBLICATIONS

U.S. Appl. No. 10/923,539, filed Aug. 20, 2004, Hensley.

(Continued)

*Primary Examiner* — Vanel Frenel
(74) *Attorney, Agent, or Firm* — Dawn-Marie Bey; King & Spalding LLP

(57) ABSTRACT

A method for repricing a reimbursement claim under at least one contract is provided herein. The method may include a combination of steps such as: converting each contract into a series of contractual terms; converting a claim into a series of claim lines, containing claim codes, unit numbers and corresponding charges for the claim codes; comparing claim codes and contractual terms and identifying matches therebetween; determining any priority conditions associated to the matching contractual terms, and eliminate any matching contractual terms that are excluded by the priority conditions; calculating the reimbursement amount for the claim by determining the reimbursement charges for the non-excluded matching contractual terms; and determining and making any adjustments depending upon any discount terms for the entire reimbursement amount.

16 Claims, 35 Drawing Sheets

U.S. PATENT DOCUMENTS

| | | | | |
|---|---|---|---|---|
| 5,583,760 | A | 12/1996 | Klesse | 705/38 |
| 5,644,778 | A | 7/1997 | Burks et al. | 705/2 |
| 5,692,501 | A | 12/1997 | Minturn | 600/301 |
| 5,704,044 | A | 12/1997 | Tarter et al. | 705/4 |
| 5,708,828 | A | 1/1998 | Coleman | 715/205 |
| 5,724,379 | A | 3/1998 | Perkins et al. | 705/2 |
| 5,793,771 | A | 8/1998 | Darland et al. | 370/467 |
| 5,815,689 | A | 9/1998 | Shaw et al. | 713/400 |
| 5,832,447 | A | 11/1998 | Rieker et al. | 705/2 |
| 5,845,254 | A | 12/1998 | Lockwood et al. | 705/2 |
| 5,879,163 | A | 3/1999 | Brown et al. | 434/236 |
| 5,890,129 | A | 3/1999 | Spurgeon | 705/4 |
| 5,907,490 | A | 5/1999 | Oliver | 700/90 |
| 5,915,241 | A | 6/1999 | Giannini | 705/2 |
| 5,930,759 | A | 7/1999 | Moore et al. | 705/2 |
| 5,950,168 | A | 9/1999 | Simborg et al. | 705/3 |
| 5,950,169 | A | 9/1999 | Borghesi et al. | 705/4 |
| 5,970,463 | A | 10/1999 | Cave et al. | 705/3 |
| 5,991,733 | A | 11/1999 | Aleia et al. | 705/8 |
| 5,991,876 | A | 11/1999 | Johnson et al. | 726/28 |
| 6,012,035 | A | 1/2000 | Freeman, Jr. et al. | 705/2 |
| 6,052,524 | A | 4/2000 | Pauna | 703/22 |
| 6,088,677 | A | 7/2000 | Spurgeon | 705/4 |
| 6,094,684 | A | 7/2000 | Pallmann | 709/227 |
| 6,111,893 | A | 8/2000 | Volftsun et al. | 370/466 |
| 6,112,183 | A | 8/2000 | Swanson et al. | 705/2 |
| 6,208,973 | B1 | 3/2001 | Boyer et al. | 705/2 |
| 6,226,658 | B1 | 5/2001 | Smith | 715/207 |
| 6,253,186 | B1 | 6/2001 | Pendleton, Jr. | 705/2 |
| 6,283,761 | B1 | 9/2001 | Joao | 434/236 |
| 6,324,516 | B1 | 11/2001 | Shults et al. | 705/2 |
| 6,341,265 | B1 | 1/2002 | Provost et al. | 705/4 |
| 6,343,271 | B1 | 1/2002 | Peterson et al. | 705/4 |
| 6,453,297 | B1 | 9/2002 | Burks et al. | 705/3 |
| 6,529,876 | B1 | 3/2003 | Dart et al. | 705/4 |
| 6,542,905 | B1 | 4/2003 | Fogel et al. | 1/1 |
| 6,587,829 | B1 | 7/2003 | Camarda et al. | 705/3 |
| 6,618,808 | B1 | 9/2003 | Johnson et al. | 726/4 |
| 6,658,630 | B1 | 12/2003 | Threatt et al. | 716/103 |
| 6,665,685 | B1 | 12/2003 | Bialic | 1/1 |
| 6,735,569 | B1 | 5/2004 | Wizig | 705/4 |
| 6,763,346 | B1 | 7/2004 | Nishida et al. | 707/802 |
| 6,915,265 | B1 | 7/2005 | Johnson | 705/2 |
| 7,016,856 | B1 | 3/2006 | Wiggins | 705/2 |
| 7,194,416 | B1 | 3/2007 | Provost et al. | 705/4 |
| 7,344,496 | B2 | 3/2008 | Iliff | 600/300 |
| 7,346,522 | B1 | 3/2008 | Baylor et al. | 705/3 |
| 7,389,245 | B1 | 6/2008 | Ashford et al. | 705/2 |
| 7,464,040 | B2 | 12/2008 | Joao | 705/2 |
| 7,774,252 | B2 | 8/2010 | Seare et al. | 705/35 |
| 7,904,317 | B1 | 3/2011 | Lesswing et al. | 705/4 |
| 2002/0019754 | A1 | 2/2002 | Peterson et al. | 705/4 |
| 2002/0077869 | A1 | 6/2002 | Doyle et al. | 705/4 |
| 2002/0138304 | A1 | 9/2002 | Fontanesi | 705/2 |
| 2002/0178120 | A1 | 11/2002 | Reid et al. | 705/59 |
| 2002/0194008 | A1 | 12/2002 | Yang et al. | 705/310 |
| 2003/0023466 | A1 | 1/2003 | Harper | 705/37 |
| 2003/0033162 | A1 | 2/2003 | Houssiaux et al. | 705/7.11 |
| 2003/0033240 | A1 | 2/2003 | Balson et al. | 705/37 |
| 2003/0046093 | A1 | 3/2003 | Erickson et al. | 705/51 |
| 2003/0046116 | A1 | 3/2003 | Horowitz et al. | 705/4 |
| 2003/0061174 | A1 | 3/2003 | Menninger | 705/400 |
| 2003/0084004 | A1 | 5/2003 | Morciniec et al. | 705/80 |
| 2003/0097329 | A1 | 5/2003 | Nabe et al. | 705/38 |
| 2003/0115156 | A1 | 6/2003 | Baker | 705/400 |
| 2003/0212582 | A1 | 11/2003 | Taschner | 705/4 |
| 2004/0024683 | A1 | 2/2004 | Morciniec et al. | 705/37 |
| 2004/0034607 | A1 | 2/2004 | Piccinelli | 705/80 |
| 2004/0083119 | A1 | 4/2004 | Schunder et al. | 705/1.1 |
| 2004/0085355 | A1 | 5/2004 | Harmes et al. | 715/751 |
| 2005/0033609 | A1 | 2/2005 | Yang | 705/2 |
| 2005/0091143 | A1 | 4/2005 | Schmidt et al. | 705/37 |
| 2005/0108067 | A1 | 5/2005 | Chapman et al. | 705/4 |
| 2005/0187797 | A1 | 8/2005 | Johnson | 705/3 |
| 2005/0247777 | A1 | 11/2005 | Pitroda | 235/380 |
| 2006/0085311 | A1 | 4/2006 | Hoerle et al. | 705/35 |
| 2007/0203834 | A1 | 8/2007 | Field | 705/40 |
| 2010/0235197 | A1 | 9/2010 | Dang | 705/3 |

FOREIGN PATENT DOCUMENTS

| | | |
|---|---|---|
| WO | WO 84/01448 | 4/1984 |
| WO | WO 91/15817 | 10/1991 |
| WO | WO 95/03569 | 2/1995 |
| WO | WO 95/12857 | 5/1995 |
| WO | WO 99/22330 | 5/1999 |
| WO | WO 99/44111 | 9/1999 |
| WO | WO 00/03343 | 1/2000 |
| WO | WO 00/66367 | 11/2000 |

OTHER PUBLICATIONS

U.S. Appl. No. 09/577,386, filed May 23, 2000, Lesswing, et al.

"National Health Plan Identifier, The Establishment of a Standard for a National Health Plan Identifier Issue Paper" [online], Mar. 11, 1998 [retrieved on Dec. 14, 2010], 13 pp., Retrieved from the Internet: http://www.payorid.com/Medicare/HIPAA.htm.

Kirby, William H., Jr., "Computer-Based Applications for Providers, Consumers and Insurers in Health Care Services and Education," *IEEE*, pp. 236-242, 1982.

North Carolina, Industrial Commission, Memorandum, "New Mandatory Medical Billing and Reimbursement Procedures," 2 pp., Nov. 30, 1999.

DownSeeker Scripts, "Free Download MedLink Script," 2 pp., Aug. 29, 1999.

The Free Library, "HNC Insurance Solutions Introduces AUTOADVISOR, the First Integrated Medical Repricing Software With Managed Care Component for the Auto Medical Claims Market" [online], *Business Wire*, Sep. 2, 1998 [retrieved on Dec. 14, 2010], 4 pp., Retrieved from the Internet: http://www.thefreelibrary.com/Hnc+Insurance+Sol...

Selby, Dayton W. And Federico, Robert J., "The Effects of Physicians' Computer Applications on Health Insurance Claims and Reimbursements," IEEE, pp. 746-751, 1979.

Miller, Lawrence G., "Reducing Health Care Costs Using Claims Adjudication Software" [online], *Physician Executive*, May 1, 1993 [retrieved on Dec. 14, 2010], 4 pp., Retrieved from the Internet: http://www.thefreelibrary.com/Reducing+health+ca...

Waterhouse, Rosie, "Medical Tests for New Benefit 'Unfair': Over-Reliance on Health Evidence Attacked" [online], The Independent, Feb. 17, 1994 [retrieved on Dec. 20, 2010], 1 p., Retrieved from the Internet: http://www.independent.co.uk/news/uk/politics/medical-tests-for-new-benefit-unfair-overreliance-on-healt...

Gustafson, Bobette M., "Preparing for Future Roles as Claims Payers" [online], *Healthcare Financial Management*, Jan. 1, 1996 [retrieved on Dec. 14, 2010[, 3 pp., Retrieved from the Internet: http://www.allbusiness.com/.../538143-1.html.

Press Release, "TriZetto Introduces NetworX Modeler" [online], Nov. 18, 2003 [retrieved on Apr. 18, 2011], 2 pp., Retrieved From the Internet: http://www.trizetto.com/newsEvents/pressReleases/2003-11-18_NetworXModeler.asp.

IBM, Solutions for Healthcare Management, "TriZetto NetworX and IBM: Driving Costs Out of Healthcare Management," 2 pp., Copyright 2009.

The Gantry Group, "ROI Value Delivery Through Streamlined Provider Contract Modeling" [online], [Retrieved on Apr. 18, 2011], 1 p., Retrieved From the Internet: http://www.gantrygroup.comihealthcare/research/detail.cfm?product_id=561.

"Healthcare Solutions: Health Plans—NetworX Pricer" [online], Copyright 2000-2011 [retrieved on Apr. 18, 2011], 1 p., Retrieved From the Internet: http://www.trizetto.com/hpSolutions/networXPricer.asp.

eHealthPartners, "TriZetto NetworX Pricer™ & Modeler™" [online], [Retrieved on Apr. 18, 2011], 1 p., Retrieved From the Internet: http://www.ehealthpartners.com/Applications/ApplicationExpertise/TriZettoNetworXPrice...

White Paper, "The Gantry Group: Is TriZetto® NetworX Modeler® Delivering on its ROI Promise?," Copyright 2010, 8 pp.

"Preferred Care Partners Selects TriZetto's Facets Software and Specialized Components to . . . ", Business Wire, May 26, 2005, 2 pages.

"CareSource Selects TriZetto's CareAdvance Enterprise Software and Specialized Components to Help It Administer Medicaid Business" [online], Business Wire, 2 pp., Sep. 5, 2006 [retrieved on Apr. 18, 2011], Retrieved From the Internet: http://www.medinfonews.com/ar/lr.htm.

"CareFirst BlueCross BlueShield Selects TriZetto's NetworX Pricer Software to Automate Claims Pricing and Help Manage Costs" [online], Sep. 21, 2006 [retrieved on Apr. 18, 2011], 1 pp., Retrieve From the Internet: http://goliath.ecnext.com/coms2/gi_0199-5783145/CareFirst-BlueCross-BlueShield-Select...

"Blue Shield of California Launches Work on System-Wide Technology Upgrade With TriZetto's Facets Software" [online], Jan. 29, 2008 [retrieved on Apr. 18, 2011], 1 pp., Retrieved From the Internet: https://www.blueshieldca.com/bsc/newsroom/pr/LegacyModernization_012908.jhtml.

"Blue Cross and Blue Shield of Minnesota Will Use TriZetto's NetworX Suite to Move Toward Value-Based Reimbursement Models" [online], Business Wire, May 11, 2010 [retrieved on Apr. 18, 2011], 2 pp., Retrieved From the Internet: http://www.businesswire.com/news/home/20100511005321/en/Blue-Cross-Blue-Shield-M...

International Search Report and Written Opinion for PCT Application No. PCT/US2007/070298, dated Jan. 7, 2008, pp. 1-11.

"Patient-Centered Primary Care Collaborative, Commonwealth Fund, Dartmouth Institute Release Landmark Consensus Document on ACOs, Medical Homes" [online], Apr. 12, 2011 [retrieved on Jun. 7, 2011], EMR and Health IT News, 9 pp. Retrieved from the Internet: http://www.emrandhipaa.com/news/2011/04/12/patient-centered-primary-care-collaborative-commonwealth-fund-dartmouth-institute-release-landmark-consensus-document-on-acos-medical-homes.

Feucht, Daniel Francis, et al., "Session # 46 PD : ICD-10 : Implications on Pricing, Reserving, IT and Strategy," Society of Actuaries, SOA '10 Health Meeting, Jun. 28-30, 2010, 27 pp.

"ICD-10-CM-PCS MS-DRG Conversion Project, ICD-9-CM Coordination & Maintenance Committee," Centers for Medicare & Medicaid Services, Sep. 16, 2009, 74 pp.

"Repricing Window," The TriZetto Group, Inc., ClaimBatch Entry-CBE, Section 8—Adding Other Information, 12 pp.

Contract Management Solutions, "Company Overview" [online], Retrieved on Aug. 3, 2004, Retrieved From: http://www.cmsi.com/company, 1 p.

Contract Management Solutions, "Solutions Overview" [online], Retrieved on Aug. 3, 2004, Retrieved From: http://www.cmsi.com/solutions, 1 p.

Dicarta Enterprise Contract Management, "Products" [online], Retrieved on Aug. 3, 2004, Retrieved From: http://www.dicarta.com/html/products, 9 pp.

Contract Management Solutions, "Contract Manager" [online], Retrieved on Aug. 3, 2004, Retrieved From: http://www.cmsi.com/solutions/cm.htm, 3 pp.

Contract Management Solutions, "Deal Manager" [online], Retrieved on Aug. 3, 2004, Retrieved From: http://www.cmsi.com/solutions/dm.htm, 1 p.

Contract Management Solutions, "Technology" [online], Retrieved on Aug. 3, 2004, Retrieved From: http://www.cmsi.com/solutions/tech.htm, 1 p.

Dicarta Enterprise Contract Management, "Healthcare" [online]Retrieved on Aug. 3, 2004, Retrieved From: http://www.dicarta.com/html/products/healthcare.cfm, 2 pp.

Contract Management Solutions, "Compliance" [online], Retrieved on Aug. 3, 2004, Retrieved From: http://www.cmsi.com/solutions/compliance.htm, 2 pp.

Contract Management Solutions, "CMXchange" [online], Retrieved on Aug. 3, 2004, Retrieved From: http://www.cmsi.com/solutions/cmxc.htm, 1 p.

International Search Report & Written Opinion issued for PCT/US2005/036971 dated Dec. 26, 2006.

FIG. 4

NETWORX ADMINISTRATION 1.2.7.1 PORT=14400

FILE HELP

| ROLES | USERS | NETWORKS | EMPLOYERS | PROVIDERS | RATE SHEETS | CONTRACT NETWORKS | CALCULATION CATEGORIES | CODE GROUPS | CLIENTS | ROUTING RULES | MAILBOXES |

12c

CATEGORIES

| CATEGORY DESCRIPTION |
|---|
| ALL CALCULATIONS |
| AMBULATORY SURGERY |
| BOARDER BABY CALCS |
| CASE RATES |
| COST CALCULATIONS |
| DISCOUNT CALCULATIONS |
| DRGS |
| MAXIMUM AMOUNTS |
| NON COVERED SERVICES |
| PER DIEMS |
| PERCENTAGES |
| REASONABLE & CUSTOMARY |
| SCHEDULES |
| STOP LOSS |
| UNIT CALCULATIONS |

40

CALCULATIONS

| CALCULATION DESCRIPTION |
|---|
| 2 LEVEL PER DIEM |
| 2 LEVEL PER DIEM, LTD BY PCT OF CHG |
| 3 LV PER DIEM |
| 4 LEVEL PER DIEM |
| PER DIEM |
| PER DIEM, EXCESS DAYS |

[ADD]  [CHANGE]  [DELETE]

FIG. 6a

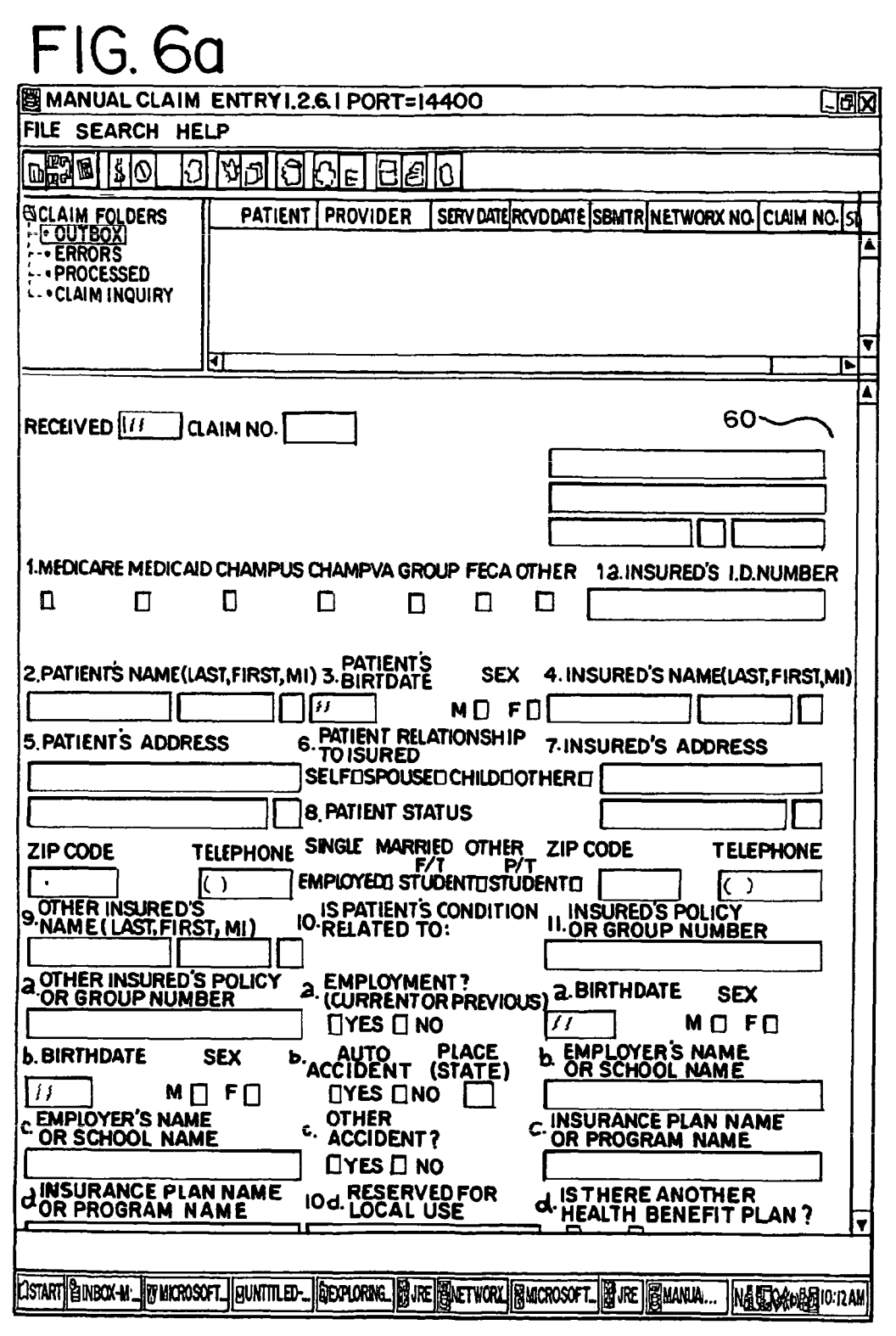

```
MANUAL CLAIM ENTRY 1.2.6.1 PORT=14400
FILE SEARCH HELP
```

| CLAIM FOLDERS | PATIENT | PROVIDER | SERV DATE | RCVD DATE | SBMTR | NETWORX NO. | CLAIM NO. | S |
|---|---|---|---|---|---|---|---|---|
| • OUTBOX | | | | | | | | |
| • ERRORS | | | | | | | | |
| • PROCESSED | | | | | | | | |
| • CLAIM INQUIRY | | | | | | | | |

RECEIVED [ / / ]   CLAIM NO. [   ]                                      60

1. MEDICARE  MEDICAID  CHAMPUS  CHAMPVA  GROUP  FECA  OTHER    1a. INSURED'S I.D. NUMBER
    ☐          ☐         ☐         ☐        ☐      ☐      ☐

2. PATIENT'S NAME (LAST, FIRST, MI)   3. PATIENT'S BIRTDATE   SEX   4. INSURED'S NAME (LAST, FIRST, MI)
                                         [ / / ]         M☐ F☐

5. PATIENT'S ADDRESS   6. PATIENT RELATIONSHIP TO ISURED   7. INSURED'S ADDRESS
                         SELF☐ SPOUSE☐ CHILD☐ OTHER☐

8. PATIENT STATUS

ZIP CODE   TELEPHONE   SINGLE  MARRIED  OTHER   ZIP CODE   TELEPHONE
                               F/T      P/T
           ( )         EMPLOYED☐ STUDENT☐ STUDENT☐          ( )

9. OTHER INSURED'S NAME (LAST, FIRST, MI)   10. IS PATIENT'S CONDITION RELATED TO:   11. INSURED'S POLICY OR GROUP NUMBER a. OTHER INSURED'S POLICY OR GROUP NUMBER   a. EMPLOYMENT? (CURRENT OR PREVIOUS)   a. BIRTHDATE   SEX
                                                ☐ YES ☐ NO                          [ / / ]    M☐ F☐ b. BIRTHDATE   SEX   b. AUTO ACCIDENT   PLACE (STATE)   b. EMPLOYER'S NAME OR SCHOOL NAME
   [ / / ]   M☐ F☐     ☐ YES ☐ NO c. EMPLOYER'S NAME OR SCHOOL NAME   c. OTHER ACCIDENT?   c. INSURANCE PLAN NAME OR PROGRAM NAME
                                      ☐ YES ☐ NO d. INSURANCE PLAN NAME OR PROGRAM NAME   10d. RESERVED FOR LOCAL USE   d. IS THERE ANOTHER HEALTH BENEFIT PLAN?

FIG. 6b

```
MANUAL CLAIM ENTRY 1.2.7.1 PORT=14400                    _ □ X
FILE SEARCH HELP
```

| CLAIM FOLDERS | PATIENT | PROVIDER | SERV DATE | RCVD DATE | SBMTR | NETWORX NO. | CLAIM NO. | ST |
|---|---|---|---|---|---|---|---|---|
| • OUTBOX | | | | | | | | |
| • ERRORS | | | | | | | | |
| • PROCESSED | | | | | | | 60 | |
| • CLAIM INQUIRY | | | | | | | | |

☐ YES ☐ NO

12. PATIENT OR AUTHORIZED PERSONS SIGNATURE

PATIENT SIGNATURE DATE / /

13. INSURED OR AUTHORIZED PERSONS SIGNATURE

14. DATE OF CURRENT: ILLNESS(FIRST SYMPTOM) OR INJURY(ACCIDENT) OR PREGNANCY(LMP) / /

15. IF PATIENT HAS HAD SAME OR SIMILAR ILLNESS, GIVE FIRST DATE / /

16. DATES PATIENT UNABLE TO WORK FROM / / TO / /

17. NAME OF REFERRING PHYSICIAN OR SOURCE

17a. ID NUMBER OF REFERRING PHYSICIAN

18. HOSPITALIZATION DATES RELATED TO SERVICES FROM / / TO / /

19. RESERVED FOR LOCAL USE

20. OUTSIDE LAB? ☐ YES ☐ NO    $CHARGES

21. DIAGNOSIS OR NATURE OF ILLNESS OR INJURY (RELATED ITEMS 1,2,3 OR 4 TO ITEM 24E BY LINE)
1.   3.
2.   4.

22. MEDICAID RESUBMISSION CODE     ORIGINAL REF. NO.

23. PRIOR AUTHORIZED NUMBER

24. A         B    C    D              E          F        G      H     I       J              K
DATES OF SERVICE    CPT/ MODIFIER    DAYS              RESERVED
FROM  TO   POS TOS HCPCS | DIAGNOSI   UNITS   EMG  FOR LOCAL ANESTHESIA
                         CODE CHARGES EPSDT  COB   USE  HRS.MNS. COST

25. FEDERAL TAX I.D. NUMBER   SSN EIN
26. PATIENTS ACCOUNT NO.
27. ACCEPT ASSIGNMENT? ☐ YES ☐ NO
28. TOTAL CHARGES
29. AMOUNT PAID
30. BALANCE DUE

31. SIGNATURE OF PHYSICIAN OR SUPPLIER
32. NAME AND ADDRESS OF FACILITY WHERE SERVICES WERE RENDERED
33. PHYSICIANS, SUPPLIER'S BILLING NAME, ADDRESS, ZIP CODE AND PHONE NUMBER

FIG. 6c

| MANUAL CLAIM ENTRY 1.2.7.1 PORT=14400 | |
|---|---|
| FILE SEARCH HELP | |

| CLAIM FOLDERS | PATIENT | PROVIDER | SERV DATE | RCVD DATE | SBMTR | NETWORX NO. | CLAIM NO. | ST |
|---|---|---|---|---|---|---|---|---|
| • OUTBOX | | | | | | | | |
| • ERRORS | | | | | | | 60 | |
| • PROCESSED | | | | | | | | |
| • CLAIM INQUIRY | | | | | | | | |

☐ YES ☐ NO

21. DIAGNOSIS OR NATURE OF ILLNESS OR INJURY (RELATED ITEMS 1,2,3 OR 4 TO ITEM 24E BY LINE 1.    3.

22. MEDICAID RESUBMISSION CODE   ORIGINAL REF. NO.

23. PRIOR AUTHORIZED NUMBER

2.    4.

24.

| A | B | C | D | E | F | G | H | I | J | K |
|---|---|---|---|---|---|---|---|---|---|---|
| DATES OF SERVICE FROM TO | POS | TOS | CPT/ HCPCS MODIFIER | DIAGNOSI CODE | CHARGES | DAYS UNITS | EPSDT | EMG COB | RESERVED FOR LOCAL USE | ANESTHESIA HRS. MNS. COST |

25. FEDERAL TAX I.D. NUMBER  SSN EIN
26. PATIENTS ACCOUNT NO.
27. ACCEPT ASSIGNMENT? ☐ YES ☐ NO
28. TOTAL CHARGES
29. AMOUNT PAID
30. BALANCE DUE

31. SIGNATURE OF PHYSICIAN OR SUPPLIER
32. NAME AND ADDRESS OF FACILITY WHERE SERVICES WERE RENDERED
33. PHYSICIANS, SUPPLIER'S BILLING NAME, ADDRESS, ZIP CODE AND PHONE NUMBER

SIGNED    DATE    //

PIN#    GRP#

PROVIDER CONTRACT
     MEDICAL CENTER 11-9999999
EFFECTIVE 04/01/1999

HOSPITAL AGREES TO PROVIDER COVERED HOSPITAL SERVICES ON THE PAYMENT TERMS SET FORTH BELOW.

HOSPITAL AGGREES TO PROVIDE ALL COVERED INPATIENT AND OUTPATIENT SERVICES ACCORDING TO THE FOLLOWING ALL INCLUSIVE PER DIEM AND DISCOUNT ARRANGEMENTS:

$750.00 MEDICAL PER DIEM
$950.00 SURGICAL PER DIEM

NORMAL DELIVERY (MOTHER & BABY)
$1,400.00 1-2 DAY STAY CASE RATE
$450.00 EACH ADDITIONAL DAY

CESAREAN SECTION (MOTHER & BABY)
$2,800.00 1-2 DAY STAY CASE RATE
$500.00 EACH ADDITIONAL DAY

ALL OTHER COVERED IMPATIENT SERVICES: 15% DISCOUNT FROM BILLED CHARGES
OUTPATIENT SERVICES: 15% DISCOUNT FROM BILLED CHARGES

STOP LOSS: FOR ANY CASE IN WHICH CHARGES EXCEED $20,000.00, HOSPITAL WILL BE PAID 85% OF BILLED CHARGES.

```
QUALIFICATIONS
         ⦿ CODE VALUES       ○ CODE GROUPING
CODE TYPES: [DRG CODE(S)                    ▼]
VALUE RANGE: [103        ]  TO  [109        ]
                  175a              175b
```

FIG.12b

```
QUALIFICATIONS
         ○ CODE VALUES       ⦿ CODE GROUPING
CODE TYPES: [--SELECT CODE TYPE--            ▼]
CODE GROUPS [--SELECT CODE GROUP--           ▼]
            AICD (ACID?)
            ALC SCHEDULE CODE VALUES
            ALCOHOL & DRUG
            ALCOHOL & DRUG DAY PROGRAM?
            AMBULATORY SURGERY                  — 177
            ASFGD
            BLOOD FACTOR 8 AND 9
            C-SECTION                        ▼
```

FIG.13a

RATE SHEET TERMS

DESCRIPTION (182)
- ☐ HEADING
- DESCRIPTION: MEDICAL (182b, 182a)
- EFFECTIVE DATES: 04/01/1997 — 05/31/1999 (182c)

QUALIFICATIONS (184)
- ○ CODE VALUES  ● CODE GROUPING (184a)
- CODE TYPES: REVENUE CODE(S) (184b)
- CODE GROUPS: PER DIEM-MEDICAL (184c)

CALCULATIONS (186)
- ● CALCULATIONS  ○ ACTIONS  ○ SUBRATE SHEETS
- ☐ CALCULATION CATEGORIES
  - ⊞☐ ALL CALCULATIONS
  - ⊞☐ CASE RATES
  - ⊞☐ COST CALCULATIONS
  - ⊞☐ DISCOUNT CALCULATIONS
  - ⊞☐ DRGS
  - ⊞☐ MAXIMUM AMOUNTS
  - ⊞☐ NON-COVERED SERVICES
  - ⊟☐ PER DIEMS
      - ○ 2 LEVEL PER DIEM
      - ● PER DIEM
- ☐ COMPLETE

PER DIEM (188)
- PRICING IS $750.00 PER DIEM. (188a)
- THIS CALCULATION WILL BE USED TO REPRICE THE [CURRENT LINE] WHEN THE CLAIM QUALIFIES FOR MORE THAN ONE TERM, THIS PRICE WILL BE USED IF IT IS THE [LAST TERM TO QUALIFY]. (189a, 189b)

[ OK ]  [ CANCEL ] (190)

FIG.13b

RATE SHEET TERMS

DESCRIPTION
- ☐ HEADING
- DESCRIPTION: SURGICAL
- EFFECTIVE DATES: 04/01/1997  12/31/9999

QUALIFICATIONS
- ○ CODE VALUES    ◉ CODE GROUPING — 192a
- CODE TYPES: REVENUE CODE(S)
- CODE GROUPS: PER DIEM-MEDICAL — 192b

CALCULATIONS — 194
- ◉ CALCULATIONS  ○ ACTIONS  ○ SUBRATE SHEETS
- ALL CALCULATIONS
  - 2 LEVEL PER DIEM
  - 2 LEVEL PER DIEM, LTD BY PCT OF CHG
  - 2 LEVEL SERVICES
  - 2 LV CASE + EXCESS PCT, LTD BY CHG
  - 2 LV CASE + PD, LTD BY CHG
  - 2 LV CASE, LTD BY CHG
  - 3 LV CASE + PD, LTD BY CHG
  - 3 LV CASE, LTD BY CHG
  - 3 LV PER DIEM — 198

☐ COMPLETE

PER DIEM
PRICING IS $950.00  PER DIEM — 192c

THIS CALCULATION WILL BE USED TO REPRICE THE [CURRENT LINE]
QUALIFIES FOR MORE THAN ONE TERM, THIS PRICE WILL BE USED IF IT IS THE [LAST TERM TO QUALIFY]  WHEN THE CLAIM

[OK]  [CANCEL]

FIG.13C

NETWORX ADMINISTRATION 1.2.7.1 PORT=14400

FILE HELP

ROLES | USERS | NETWORKS | EMPLOYERS | PROVIDERS | RATE SHEETS | CONTRACT NETWORKS | CALCULATION CATEGORIES | CODE GROUPS | CLIENTS | ROUTING RULES | MAILBOXES

RATE SHEET: HMC     VALID: 04-01-1999    THROUGH 12-31-9999     RATE SHEET SEARCH

- HMC - HARDY MEDICAL CENTER
  - PER DIEM
  - CASE RATE
  - OUTPATIENT SERVICES
  - STOP LOSS
  - FOOTNOTES

1. PER DIEM
  1.1 MEDICAL
    CODE GROUP - PER DIEM - MEDICAL. PRICING IS $750.00 PER DIEM. -2,6
  1.2 SURGICAL
    CODE GROUP - PER DIEM - SURGICAL. PRICING IS $950.00 PER DIEM. -2,6
2. CASE RATE
3. OUTPATIENT SERVICES
4. STOP LOSS
FOOTNOTES
1- THIS CALCULATION WILL BE USED TO REPRICE THE ENTIRE CLAIM.
2- THIS CALCULATION WILL BE USED TO REPRICE THE CURRENT LINE
3- THIS CALCULATION WILL BE USED TO REPRICE THE MATCHING LINE AS A GROUP.
4- WHEN THE CLAIM QUALIFIES FOR MORE THAN ONE TERM, THIS PRICE WILL BE USED IF IT IS THE SMALLEST AMOUNT.
5- WHEN THE CLAIM QUALIFIES FOR MORE THAN ONE TERM, THIS PRICE WILL BE USED IF IT IS THE LARGEST AMOUNT.
6- WHEN THE CLAIM QUALIFIES FOR MORE THAN ONE TERM, THIS PRICE WILL BE USED IF IT IS THE LAST TERM TO QUALIFY.
7- PLEASE NOTE: NO MORE TERMS WILL BE EXAMINED FOR THIS CLAIM LINE IF IT QUALIFIES UNDER THESE TERMS.

195

ADD SHEET | CHANGE SHEET | DELETE SHEET | COPY SHEET | ADD ITEM | CHANGE ITEM | DELETE ITEM | COPY ITEM

FIG.14

RATE SHEET TERMS

DESCRIPTION
☐ HEADING
DESCRIPTION: NORMAL DELIVERY (MOM & BABY)
EFFECTIVE DATES: 04/01/1997   12/31/9999

QUALIFICATIONS
○ CODE VALUES   ● CODE GROUPING
CODE TYPES: ICD-9 PROCEDURE CODE(S)
CODE GROUPS: NORMAL DELIVERY

CALCULATIONS
● CALCULATIONS   ○ ACTIONS   ○ SUBRATE SHEETS

- ALL CALCULATIONS
  - 2 LEVEL PER DIEM
  - 2 LEVEL PER DIEM, LTD BY PCT OF CHG
  - 2 LEVEL SERVICES
  - 2 LV CASE + EXCESS PCT, LTD BY CHG
  - 2 LV CASE + PD, LTD BY CHG
  - 2 LV CASE, LTD BY CHG
  - 3 LV CASE + PD, LTD BY CHG
  - 3 LV CASE, LTD BY CHG
  - 3 LV PER DIEM

☐ COMPLETE

CASE RATE PLUS PER DIEM, LIMITED BY CHARGE. 197a
PRICING IS A CASE RATE OF [$1,400.00] FOR UP TO [2] DAYS AND [$450.00] PER DIEM FOR EACH ADDITIONAL DAY.
LIMIT THE ALLOWED TO THE [COMBINED CHARGES].

197b  197c  197d

THIS CALCULATION WILL BE USED TO REPRICE THE [ENTIRE CLAIM]. WHEN THE CLAIM
QUALIFIES FOR MORE THAN ONE TERM, THIS PRICE WILL BE USED IF IT IS THE [LAST TERM TO QUALIFY].

[ OK ]   [ CANCEL ]

FIG.15

RATE SHEET TERMS

DESCRIPTION
☐ HEADING
DESCRIPTION: C-SECTION (MOM & BABY)
EFFECTIVE DATES: 04/01/1997   12/31/9999

QUALIFICATIONS
○ CODE VALUES   ● CODE GROUPING
CODE TYPES: ICD-9 PROCEDURE CODE(S)
CODE GROUPS: C-SECTION

CALCULATIONS
● CALCULATIONS   ○ ACTIONS   ○ SUBRATE SHEETS

- ☑ ALL CALCULATIONS
  - ○ 2 LEVEL PER DIEM
  - ○ 2 LEVEL PER DIEM, LTD BY PCT OF CHG
  - ○ 2 LEVEL SERVICES
  - ○ 2 LV CASE + EXCESS PCT, LTD BY CHG
  - ○ 2 LV CASE + PD, LTD BY CHG
  - ○ 2 LV CASE, LTD BY CHG
  - ○ 3 LV CASE + PD, LTD BY CHG
  - ○ 3 LV CASE, LTD BY CHG
  - ○ 3 LV PER DIEM

☐ COMPLETE

CASE RATE PLUS PER DIEM, LIMITED BY CHARGE
PRICING IS A CASE RATE OF [$2,800.00] FOR UP TO [2] DAYS AND [$500.00] PER DIEM FOR EACH ADDITIONAL DAY. LIMIT THE ALLOWED TO THE [COMBINED CHARGES].

THIS CALCULATION WILL BE USED TO REPRICE THE [ENTIRE CLAIM] WHEN THE CLAIM QUALIFIES FOR MORE THAN ONE TERM, THIS PRICE WILL BE USED IF IT IS THE [LAST TERM TO QUALIFY].

[OK]   [CANCEL]

FIG. 16

RATE SHEET TERMS

DESCRIPTION
☐ HEADING
DESCRIPTION: ALL OTHER INPATIENT SERVICES
EFFECTIVE DATES: 04/01/1997   12/31/9999

QUALIFICATIONS
◉ CODE VALUES   ○ CODE GROUPING
CODE TYPES: ALL REMAINING CODES

CALCULATIONS
◉ CALCULATIONS   ○ ACTIONS   ○ SUBRATE SHEETS

- 📁 CALCULATION CATEGORIES
  - 📁 ALL CALCULATIONS
  - 📁 CASE RATES
  - 📁 COST CALCULATIONS
  - 📁 DISCOUNT CALCULATIONS
    - ◉ DISCOUNT PCT
    - ○ DISCOUNT PCT W/ THRESHOLD
    - ○ PROVIDER DISCOUNT PCT
  - 📁 DRGS
  - 📁 MAXIMUM AMOUNTS
  - 📁 NON-COVERED SERVICES

☐ COMPLETE

DISCOUNT PERCENT
PRICING IS A [15%] DISCOUNT OF THE CHARGE.

THIS CALCULATION WILL BE USED TO REPRICE THE [ENTIRE CLAIM] WHEN THE CLAIM QUALIFIES FOR MORE THAN ONE TERM, THIS PRICE WILL BE USED IF IT IS THE [LAST TERM TO QUALIFY.]

[OK]   [CANCEL]

FIG.17

RATE SHEET TERMS

DESCRIPTION
☐ HEADING
DESCRIPTION: ALL OTHER INPATIENT SERVICES
EFFECTIVE DATES: 04/01/1997   12/31/9999

QUALIFICATIONS
⊙ CODE VALUES   ○ CODE GROUPING
CODE TYPES: ALL OTHER OUTPATIENT SERVICES ▼

CALCULATIONS
⊙ CALCULATIONS  ○ ACTIONS  ○ SUBRATE SHEETS

- CALCULATION CATEGORIES
  - ALL CALCULATIONS
  - CASE RATES
  - COST CALCULATIONS
  - DISCOUNT CALCULATIONS
    - ◇ DISCOUNT PCT
    - ◇ DISCOUNT PCT W/ THRESHOLD
    - ◇ PROVIDER DISCOUNT PCT
  - DRGS
  - MAXIMUM AMOUNTS
  - NON-COVERED SERVICES

☐ COMPLETE

DISCOUNT PERCENT
PRICING IS A [15%] DISCOUNT OF THE CHARGE.
THIS CALCULATION WILL BE USED TO REPRICE THE [ENTIRE CLAIM ▼] WHEN THE CLAIM
QUALIFIES FOR MORE THAN ONE TERM, THIS PRICE WILL BE USED IF IT IS THE [LAST TERM TO QUALIFY. ▼]

[ OK ]   [ CANCEL ]

FIG.18

RATE SHEET TERMS

DESCRIPTION
☐ HEADING
DESCRIPTION: STOP LOSS
EFFECTIVE DATES: 04/01/1997    12/31/9999

QUALIFICATIONS
⊙ CODE VALUES    ○ CODE GROUPING
CODE TYPES: ALL REMAINING CODES

CALCULATIONS
⊙ CALCULATIONS    ○ ACTIONS    ○ SUBRATE SHEETS

- ☑ ALL CALCULATIONS
  - ○ 2 LEVEL PER DIEM
  - ○ 2 LEVEL PER DIEM, LTD BY PCT OF CHG
  - ○ 2 LEVEL SERVICES
  - ○ 2 LV CASE + EXCESS PCT, LTD BY CHG
  - ○ 2 LV CASE + PD, LTD BY CHG
  - ○ 2 LV CASE, LTD BY CHG
  - ○ 3 LV CASE + PD, LTD BY CHG
  - ○ 3 LV CASE, LTD BY CHG
  - ○ 3 LV PER DIEM

☐ COMPLETE

STOP LOSS

IF THE TOTAL CHARGE EXCEEDS $20,000.00 , PRICING IS RECALCULATED TO BE 85% OF THE TOTAL CHARGE.
THIS CALCULATION WILL BE USED TO REPRICE THE ENTIRE CLAIM WHEN THE CLAIM QUALIFIES FOR MORE THAN ONE TERM, THIS PRICE WILL BE USED IF IT IS THE LAST TERM TO QUALIFY.

[ OK ]    [ CANCEL ]

FIG.20

COMPLETED RATE SHEET

MEDICAL CENTER

1. INPATIENT PER DIEM
*1.1 MEDICAL*
REVENUE CODES IN PER DIEM - MEDICAL. REPRICE AT $750.00 PER DAY. -2,6

*1.2 SURGICAL*
REVENUE CODES AND CPT4 PROCEDURE CODES IN PER DIEM - SURGICAL. REPRICE AT $950.00 PER DAY. -2,6

2. INPATIENT CASE RATE
*2.1 NORMAL DELIVERY 1-2 DAYS*
ICD-9 PROCEDURE CODES IN NORMAL DELIVERY. REPRICE AT $1,400.00 FOR UP TO 2 DAYS. $450.00 PER DEIM, THEREAFTER. -1,6

*2.2 C-SECTION*
ICD-9 PROCEDURE CODES IN C-SECTION. REPRICE AT $2,800.00 FOR UP TO 2 DAYS. $500.00 PER DIEM THEREAFTER. -1,6

3. INPATIENT SERVICES
*3.1 ALL OTHER INPATIENT SERVICES*
ALL REMAINING CODES. REPRICE AT 15% OF CHARGES. -2,6

4. OUTPATIENT SERVICES
*4.1 ALL OTHER OUTPATIENT SERVICES*
ALL REMAINING CODES. PREPRICE AT 15% OF CHARGES. -2,6

5. STOP LOSS
*5.1 STOP LOSS*
ALL REMAINING CODES. IF REPRICED AMOUNT EXCEEDS $20,000.00 THE CLAIM WILL BE REPRICED AT 85% OF CHARGES. -1,6

FOOTNOTES
1- THIS CALCULATION WILL BE USED TO REPRICE THE ENTIRE CLAIM.
2- THIS CALCULATION WILL BE USED TO REPRICE THE CURRENT LINE.
3- THIS CALCULATION WILL BE USED TO REPRICE THE MATCHING LINE AS A GROUP.
4- WHEN THE CLAIM QUALIFIES FOR MORE THAN ONE TERM, THIS PRICE WILL BE USED IF IT IS THE LARGEST AMOUNT.
5- WHEN THE CLAIM QUALIFIES FOR MORE THAN ONE TERM, THIS PRICE WILL BE USED IF IT IS THE SMALLEST AMOUNT.
6- WHEN THE CLAIM QUALIFIES FOR MORE THAN ONE TERM, THIS PRICE WILL BE USED IF IT IS THE LAST TERM TO QUALIFY.
7- PLEASE NOTE: NO MORE TERMS WILL BE EXAMINED FOR THIS CLAIM/LINE IF IT QUALIFIES UNDER THESE TERMS.

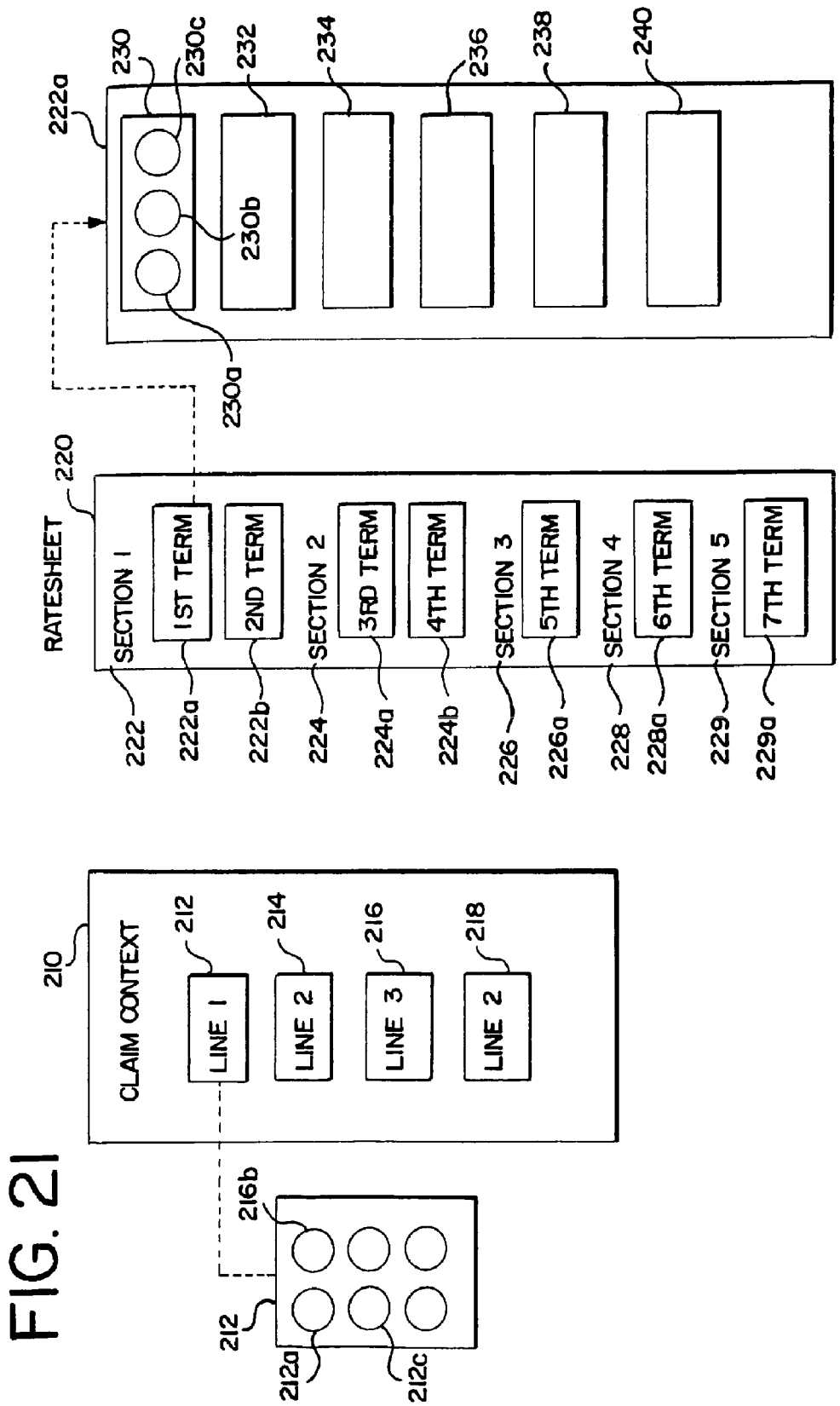

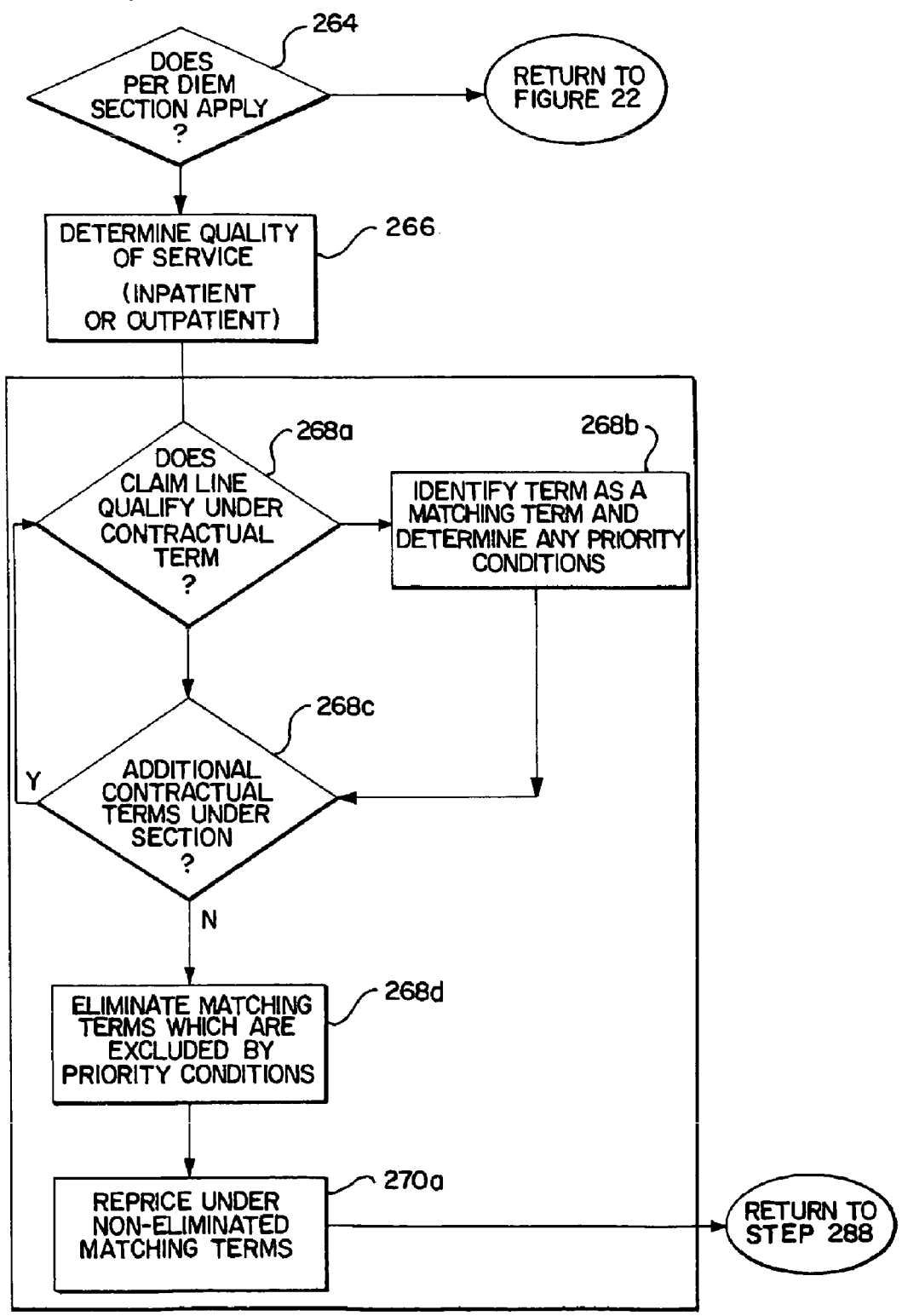

FIG.24

REPRICING WORKSHEET                                                                300

PRINT | BACK

DATE 03/23/2000 PAGE
WORKSHEET NO 100323CWQXVN
PROCESSOR DRNALC

REPRICING WORKSHEET

CLIENT/CARRIER: UNICARE LIFE & HEALTH    MEMBER    EV   SLBYAVGDAILY1
INSURANCE COM
AUSTIN PAYPOINT (228)   MEMBER ID 15
POST OFFICE BOX 833933   PATIENT   DEB NELSON
RICHARDSON, TX 75083   EMPLOYER EMPLOYER ADVANTAGE
POLICY NO 130085

PROVIDER OF SERVICE   HARDY MEDICAL CENTER   PATIENT NO
TIN                   11-9999999              DIAGNOSIS  114
ADMISSION DATE        01/09/2000              PERIOD:    TO

| REV CODE | DESCRIPTION | UNITS | CHARGE | NOT PRICED | DISCOUNT | NETWORK ALLOWABLE |
|---|---|---|---|---|---|---|
| 120 | MEDICAL | 4 | $20,000.00 | $0.00 | $17,000.00 | $3,000.00 |
|  | **TOTAL |  | $20,000.00 | $0.00 | $17,000.00 | $3,000.00 |

THE ABOVE WAS REPRICED USING THE AMERICAN LIFECARE NEGOTIATED PRICING.

| | MANUAL CLAIM ENTRY 1.2.6.1 PORT=14400 | | | | | |
|---|---|---|---|---|---|---|
| FILE SEARCH HELP | | | | | | |

| | PATIENT | PROVIDER | SERV DATE | RCVD DATE | SBMTR | NETWORX NO. | CLAIM NO. |
|---|---|---|---|---|---|---|---|
| OUTBOX | DAVE, EXAMPLE6 | DAVE E. WILLIAMS M.D. | 1999-07-12 | 1999-12-28 | DEM | 1003220RHJNO | |
| ERRORS | SLBYMAXLOSMAXDISC4, EV | ST MICHEAL HEALTH CARE CENTER | 2000-01-09 | 2000-02-29 | EMALC | 100322BHWGNO | |
| PROCESSED | FRESH SLMAXLOSMAXDISC4,... | ST MICHEAL HEALTH CARE CENTER | 2000-01-09 | 2000-03-22 | EMALC | 100322C2SLVP | |
| ALL | | | | | | | |

| 50. PAYER | 51. PROVIDER NO. | 52. REL | 53. ASG | PRIOR 54. PAYMENTS | EST 55. AMT DUE | 56. |
|---|---|---|---|---|---|---|
| UNICARE | | | | | | |

57. [ ] DUE FROM PATIENT [ ]

| INSURED'S 58. NAME | FIRST | MI | 59. P.REL | CERT-SSN- 60. HIC-ID NO. | 61. GROUP NAME | INSURANCE 62. GROUP NO. |
|---|---|---|---|---|---|---|
| SLBYAVG DAILY | EV | | | 15 | EMPLOYER ADVANTAGE | 130085 |

| 63. TREATMENT AUTHORIZATION CODES | 64. ESC | EMPLOYER 65. NAME | 66. STREET | CITY | ST | ZIP CODE |
|---|---|---|---|---|---|---|
| | | EMPLOYER ADVANTAGE | 705 ILLINOIS, #7 | JOPLIN | MO | 64801 |

| 67. PRIN DIAG | 68. CODE | 69. CODE | 70. CODE | OTHER DIAG. CODES 71. CODE | 72. CODE | 73. CODE | 74. CODE | 75. CODE | 76. ADM DIAG | 77. E-CODE | 78. |
|---|---|---|---|---|---|---|---|---|---|---|---|
| 760 | | | | | | | | | | | |

| 79. PC | 80. PRINCIPAL PROCEDURE CODE DATE | 81. OTHER PROCEDURE CODE DATE | OTHER PROCEDURE CODE DATE | 82. ATTENDING PHYS ID |
|---|---|---|---|---|
| [ ] | 72 | | | |
| | | | | 83. OTHER PHYS ID |

84. REMARKS

OTHER PHYS ID

85. PROVIDER REPRESENTATIVE    86. DATE

FIG.26

REPRICING WORKSHEET

PRINT | BACK

DATE 03/23/2000 PAGE
WORKSHEET NO 100323CWQXVN
PROCESSOR DRNALC

REPRICING WORKSHEET

CLIENT/CARRIER: UNICARE LIFE & HEALTH   MEMBER   EV   SLBYAVGDAILY1
INSURANCE COM
AUSTIN PAYPOINT (228)   MEMBER ID 15
POST OFFICE BOX 833933   PATIENT   DEB NELSON
RICHARDSON, TX 75083   EMPLOYER EMPLOYER ADVANTAGE
POLICY NO 130085

PROVIDER OF SERVICE   HARDY MEDICAL CENTER   PATIENT NO
TIN   11-9999999   DIAGNOSIS 780
ADMISSION DATE   01/09/2000   PERIOD:   TO

| REV CODE | DESCRIPTION | UNITS | CHARGE | NOT PRICED | DISCOUNT | NETWORK ALLOWABLE |
|---|---|---|---|---|---|---|
| 120 | MEDICAL | 4 | $20,000.00 | $0.00 | $17,700.00 | $2,300.00 |
|  | **TOTAL |  | $20,000.00 | $0.00 | $17,700.00 | $2,300.00 |

THE ABOVE WAS REPRICED USING THE AMERICAN LIFECARE NEGOTIATED PRICING.

METHOD AND APPARATUS FOR REPRICING A REIMBURSEMENT CLAIM AGAINST A CONTRACT

CROSS REFERENCE TO RELATED APPLICATION

The present application is a divisional application of and claims priority to U.S. patent application Ser. No. 12/975,647, filed Dec. 22, 2010, entitled "Novel Method and Apparatus for Repricing a Reimbursement Claim Against a Contract," which is a divisional application of and claims priority to U.S. patent application Ser. No. 09/577,386, filed May 23, 2000, entitled "Novel Method and Apparatus For Repricing a Reimbursement Claim Against a Contract," now U.S. Pat. No. 7,904,317, which claims priority to Provisional Application Ser. No. 60/159,306, filed Oct. 14, 1999, entitled "Novel Method in System Utilizing Distributive Processing and Modularized Components Lodging to Design Software," all of which are incorporated herein by reference in their entirety.

REFERENCE TO MICROFICHE APPENDIX

Reference is made to a Microfiche Appendix hereto, having a total of 1 microfiche and a total of 43 sheets comprising approximately 930 separate programs.

FIELD OF THE INVENTION

This invention relates to a computer method and apparatus for processing and modularizing software, and more particularly, to a method and system for modularizing software for repricing a reimbursement claim against a contract.

BACKGROUND OF THE INVENTION

A preferred provider organization (referred to herein as "PPO") is a collection of physicians, hospitals, clinics, etc. (referred to herein as "providers") which have agreed to provide healthcare services to PPO members (such as employers, employees, and consumers, referred to herein as members) at a reduced cost. The individual providers contract with the PPO to provide specific services to the members at a shared cost. It is important to note that a single provider may belong to a number of PPOs, For instance, a cardiologist may belong to two or more hospitals, each hospital having a physician PPO with its doctors. The cardiologist may also belong to a PPO formed by a collection of cardiologists. The PPOs further contract with insurance companies, third party administrators, and employers (referred to herein as "Insurers") in order to share the allocation of risk and cost. Since Insurers can reach a broad area and range of members, the Insurers develop and group numerous PPOs to cover such a broad range.

The reimbursement of the healthcare services provided by the providers is designed about a submitted claim system built for point of service insurance. When a provider treats a member, the provider submits a claim, for the services rendered, not to the PPO but to the Insurer for reimbursement thereof. Since, as mentioned above, a single provider contracts with numerous PPOs (with separate contractual arrangements for each), and the PPOs then contract with the Insurer, the Insurer must review all governing contracts to determine the proper amount of the reimbursement.

By way of example, a typical claim may include services from multiple doctors for various services performed. For instance, a claim may include services from a Radiologist for $1,000, an Emergency physician for $2,000, and an Anesthesiologist for $3,000. Each physician may have a contract with the PPO or Insurer to pay 100% of their services under $3000, but the hospital may also have a contract with the PPO stating that submitted claims in excess of $5000 for a single patient will be repriced at 85% of the charges. If the Insurer reimburses the claim as is, the Insurer has overpaid. Alternatively, if the Insurer reprocesses the claim under the governing contracts and reduces the reimbursements proportionally to each physician (known as "repricing"), the physicians may disagree with the proportionality or the repricing and appeal their reimbursement amount. In order to avoid such repricing by the Insurer, physicians may unbundle the claim into three claims, and submit the three claims separately. The separately submitted claims each receive the total amount of their reimbursement but the Insurer has overpaid.

Since, Insurers may have tens of thousands of separate contracts covering hundreds of thousands of individual providers the ability to review all governing contracts for every submitted claim is extremely time consuming. If the Insurer, however, pays all submitted claims as is, the Insurer will be overpaying. To compensate with overpaying claims Insurers may spot check claims or check every claim. When, however, the Insurer begins accurately checking all claims, reimbursement is significantly delayed. In response to Insurer's delaying reimbursements, laws have been enacted that require Insurers to reimburse claims within a specific period or pay a penalty. As such, Insurers may intentional short each reimbursement, regardless of any governing contracts.

Prior systems or software, which managed contracts, typically viewed the contracts as linear single tier contracts. Each contract was independent of all other contracts. Moreover, if a contract was outdated, replaced or no longer in effect (or if a term within the contract was replaced or no longer in effect) a new contract would be developed from a contract template. The new contract would be added to the end of the outdated contract, providing the Insurer with a long linear list of contracts, some of which were no longer in effect. In order to determine which contract governed a claim or claim line the Insurer would have to review all contracts, determine which terms governed, the priority of the governing terms and determine if subsequent contracts governed over prior ones. As multi-tiered contracts developed, i.e. one tier governing the provider and the PPO and a second tier governing the PPO and the Insurer, the systems similarly bundled the two contracts end-to-end, into a single tier contract, effectuating the same problems. Since providers now belong to numerous PPOs, numerous contracts are created and the ability to update and manage these contracts has now become extremely difficult. When two or three multi-tiered contracts are bundled into single linear contracts, there is no interaction between the multi-tiered contracts. Consequently, if a provider changed information in one contract, the information would have to be changed throughout all governing contracts or an entirely new contract would have to be created.

As such a need exists for a method and apparatus, which provide the ability to organize, maintain and modify these contracts between the Insurers, the PPOs and the providers. The method and apparatus should be able to create contracts, store generally information globally apart from the terms, such that other contracts and/or claims may share the information. This information which when changed or edited will then be changed throughout each contract or claim. Moreover, since all contracts are governed by pre-defined industry standards, the contracts may now be organized and processed to provide the method and apparatus with the ability to determine which contracts and terms govern a claim, without having to manually search through each contract.

As such, a need also exists to provide the Insurers and PPOs with the ability to determine the correct reimbursement for claims based upon these governing contracts and terms. Moreover, a need exists to provide adequate reasons, based upon these governing contracts, as to why claims were reprocessed. Moreover, the ability to control the data integrity of the contracts and claims is significantly increased. Modifications to contracts are easy and globally done. Additionally, the need exists for a centralized database to maintain and manage the contracts. The ability to electronically submit claims and have the claims repriced through the database would greatly decrease delays in reprocessing. The PPO or Provider electronically submitting the claim would receive immediately (approximately) the amount of the reimbursement, and the reasons why the claim was repriced.

SUMMARY OF THE INVENTION

In accordance with the present invention a method and apparatus provides for the repricing of reimbursement claims against contracts. In an embodiment of the present invention, a method for repricing a reimbursement claim under at least one contract includes converting each contract into a series of contractual terms and converting the claim into a series of claim lines. The method then sequentially compares each claim line against each contractual term of a contract. When a claim line satisfies a contractual term, the method identifies the contractual term as a matching contractual term associated to the claim line. Upon identifying all matching contractual terms, the method will determine any priority conditions associated to the matching contractual terms, and eliminate any matching contractual terms that are excluded by such priority conditions. The method then calculates the reimbursement amount for the claim by determining the reimbursement charges for the non-excluded matching contractual terms. The method may then determine and make any adjustments depending upon any discounts or stop losses for the entire reimbursement amount.

In other embodiments, the method would store the reimbursement amount and the repriced claim in a storage location. A second claim being repriced would be compared to other repriced claims to determine if the claims are identical or whether the claims were unbundled from a single claim. If the claims were unbundled, the method would bundle the claims and reprice the bundled claim, replacing any reimbursement amounts for the unbundled claims.

Other embodiments provide for the contracts to be stored within a data center, on a network. The data center stores a plurality of networks, each containing a plurality of contracts. The contracts having specific identifying codes allow the contracts to be sorted in specific networks: The reimbursement claims also containing identifier codes identify which network the claim will be repriced against. Once the network is located the method determines which contract(s), within the network, governs over the claim. The method would then reprice the claim against the governing contracts. Default settings, or user-defined settings could select the highest or lowest reimbursement value from the governing contracts.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 4 is an example of the calculation categories window with the category Per Diems highlighted;

FIG. 6a is the top portion of an example of a claim form window used for creating a new reimbursement claim;

FIGS. 6b and 6c are the bottom portions of FIG. 6a;

FIG. 7 is an example of a completed claim form;

FIG. 9 is an example of a provider contract used to create a rate sheet with the contract platform;

FIG. 11 is an example of the Rate Sheet window showing the rate sheet of FIG. 10B prior to adding any terms of the rate sheet;

FIG. 12a is an example of the qualifications box, which is part of the Rate Sheet Terms window of FIG. 12, used to determine the specific codes within a code range that the term will qualify under;

FIG. 12b is an example of the qualifications box of FIG. 12, illustrating a few of the different types of pre-defined code groups that are available;

FIG. 13a is an example of the Rate Sheet Terms window containing information needed to create the Per Diem—Medical term of the contract from FIG. 9;

FIG. 13b is an example of the Rate Sheet Terms window containing information needed to create the Per Diem—Surgical term of the contract from FIG. 9;

FIG. 13c is an example of the Rate Sheet window with the terms Per Diem Medical and Surgical added;

FIGS. 14-18 are examples of the Rate Sheet Terms window, each Figure containing information to create a term of the contract from FIG. 9;

FIG. 20 is a hardcopy representation of FIGS. 19A & 19B;

FIG. 21 is a block diagram illustrating a Rate Sheet and a Claim;

FIG. 23 is a flow diagram illustrating a sub-processing flow used to reprice a claim;

FIG. 24 is a repricing worksheet window displaying information in relation to the repricing of the claim illustrated in FIG. 7 against the rate sheet illustrated in FIG. 20;

FIGS. 25a and 25b are split screen window depicted a second claim;

FIG. 26 is a repricing worksheet window displaying information in relation to the repricing of the claim illustrated in FIGS. 25a and 25b against the rate sheet illustrated in FIG. 20.

DETAILED DESCRIPTION OF THE DRAWINGS

Figure 1:
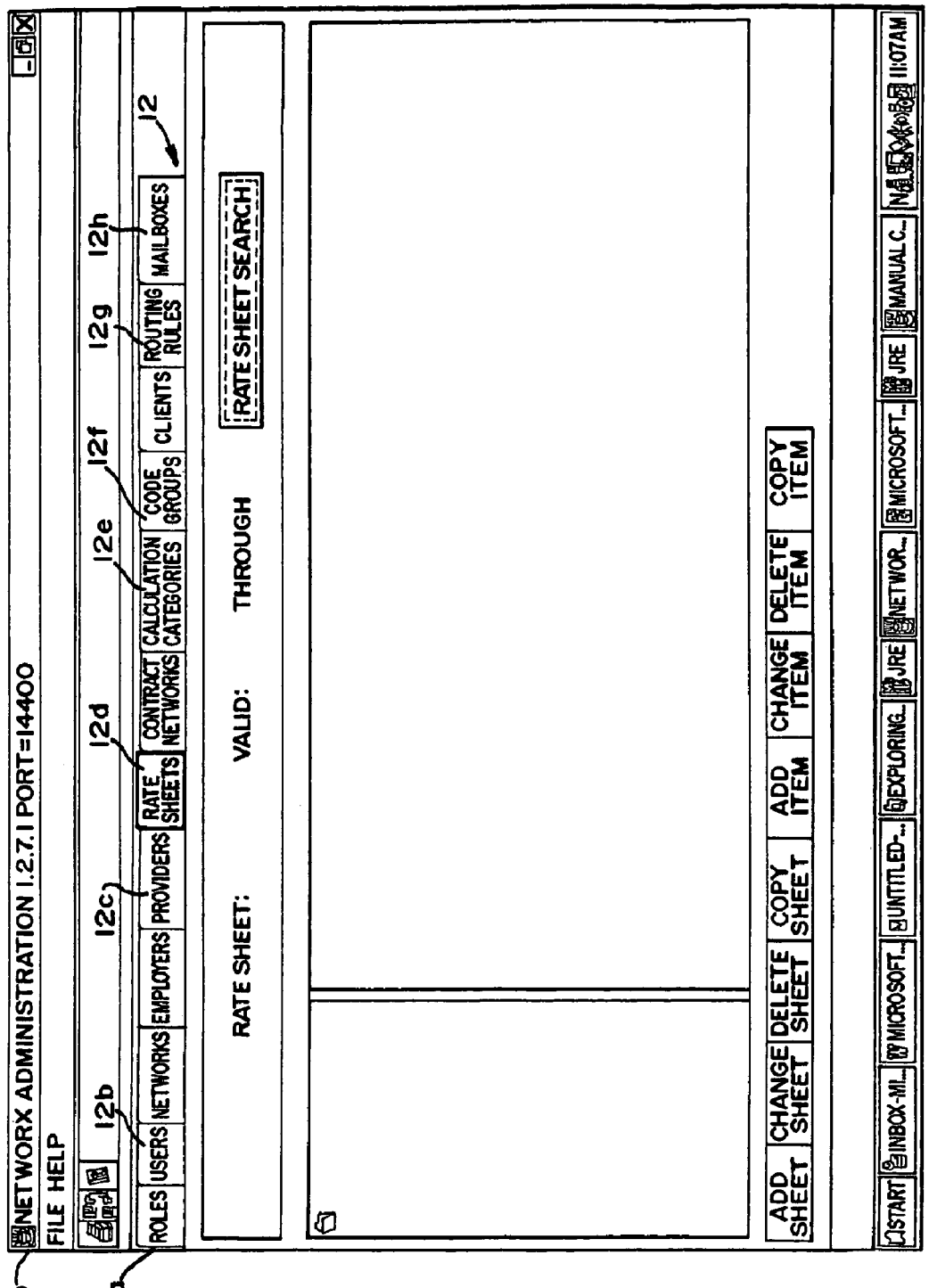
FIG. 1 is an example of an Administration Window for managing, creating, and maintaining rate sheets.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

A. Overview

Medical contracts entered between PPOs, Providers and Insurers, and reimbursement claims, submitted by the PPOs or Provider to the Insurers, utilize standards driven and created by the industry in order to maintain a single continuity throughout the industry. Typically an Insurer receiving a reimbursement claim would manually reprice or reprocess the claim. Contracts and claims maintained and stored by systems, in the prior art, were done simply to store the information, not to actually reprice or reprocess the claim. The standards, discussed in greater detail below, allow for the contracts and claims to be broken or torn down into standard pre-defined, as well as user defined, contract terms and claim lines. Once broken down, these contract terms may be organized and sorted to provide a repricing flow, which can be applied to virtually all medical contracts. The claim lines may now be "bounced" against governing contracts to determine the proper amount of the reimbursement.

In the preferred embodiment, an input and output device, such as a mouse, for "clicking" or selecting graphic elements as well as a keyboard for inputting and editing, are used to manage and maintain the contracts and reimbursement claims. The system using a contract platform, such as Resource Information Management Systems Inc.'s NetworX™ Administration software, provides a user with the means to create and manage contracts. The contract platform may be separate and apart from a platform used to create, manage and reprocess reimbursement claims, referred to herein as a reimbursement platform. The reimbursement platform, such as Resource Information Management Systems Inc.'s Manual Claim Entry 1.2.6.1 software, allows the Insurer to create reimbursement claims and reprice the claims by bouncing the claims against the contracts managed by the NetworX™ Administration software. The two platforms while preferably separate platforms may be combined into a single platform.

The reimbursement platform preferably permits the Insurer to manually create or enter the reimbursement and designed to accept the reimbursement claims through various communication mediums. Reimbursement claims received through various communication mediums, such as digital or electronic transfers, would speed up the reprocessing of the claims.

Preferably the contract terms and claim lines are gathered, by the above mentioned platforms, and stored individually as specific types of beans, discussed in greater detail below. The platforms are created using reusable software components, which can be used with a software development environment. Software development environments can integrate visual and source views of the components through use of certain features such as, for example, drag-and-drop. The drag-and-drop feature allows a software developer to modify the property values associated with the graphic user interface or "GUI" component while simultaneously viewing the modifications to provide the user with a type of virtual processing. The virtual processing pattern removes the dependence between components, because components at all levels have very little interdependence between inner components. It makes the systems easier to modify and upgrade, such that individual components may be replaced rather than replacing entire products. These components may be downloaded and installed using standard Internet technologies.

Illustration figures used throughout represent a general overview of the graphical user interface for the windows and features used by the contract platform and the reimbursement platform. The illustrations used throughout are for example only and are not used to limit or restrict the scope of the claims or the invention.

B. Contracts Platform

The contract platform, as mentioned above, provides the ability to create, maintain and manage contracts (also referred to herein as "rate sheets") between the PPOs, Providers, and Insurers. Each rate sheet includes terms, created and stored independently of each other, providing the means to edit and change the terms separately. Moreover, data shared by both the contract platform and the reimbursement platform, for instance, provider or PPO identification data, is stored globally separately from the two platforms, permitting access to such data from either platform. This provides a dynamic inter-relationship among the platforms and the data maintained and managed by both of the platforms.

FIG. 1 illustrates an example of a Main Administration screen 10, which permits the user to build, manage, code, route and maintain the rate sheets. Various tabs 12 are included to help assist the user accomplish these aforementioned functions and are listed across the top of the Main Administration screen 10. The tabs 12 further permit the user to access the pre-loaded industry standards, mentioned above, and to sort, group, and define new standards. These tabs 12, discussed in greater detail below, include, but are not limited to, Roles 12a, Users 12b, Providers 12c, RateSheets 12d, Calculation Categories 12e, Code Groups 12f, Routing Rules 12g, and Mailboxes 12h.

The Roles tab 12a allows a user to define and manage security access levels for various groups of personnel employed by the user. An Insurer using the platform may have numerous personnel groups that separately access, maintain, edit and enter the information stored by the platforms. The Roles tab 12a allows the Insurer to define the level of access for each group. For example, since contract data entry personnel typically only need access to read/write/delete information regarding rate sheets on the contract platform, access to the reimbursement platform would be restricted. The Roles tab 12a, for security reasons, would typically only be available for a platform administrator. The platform administrator would define the level of access utilizing the Roles tab 12a and assign individual security logins and passwords to each personnel, using the Users tab 12b.

Figure 2:
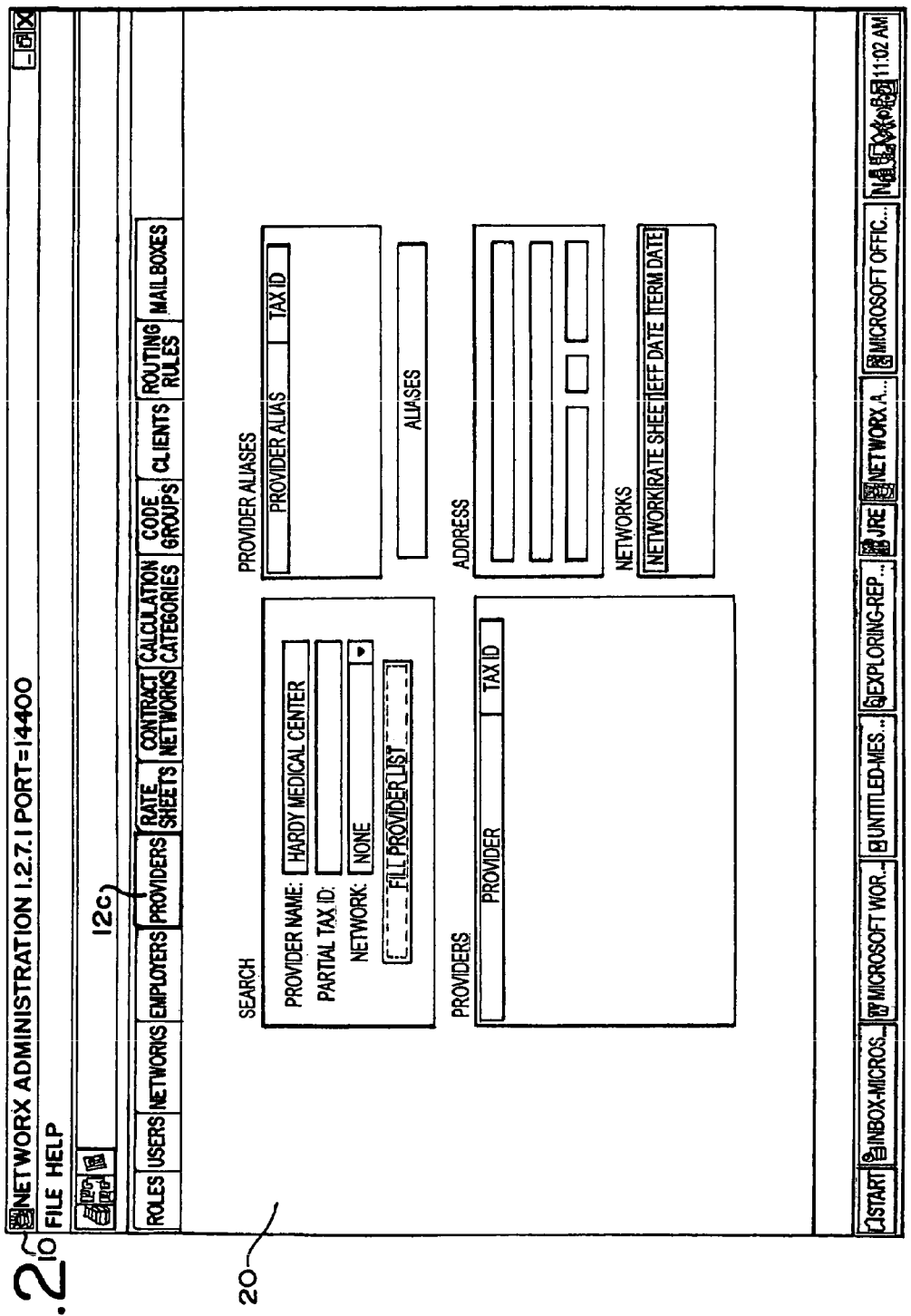
FIG. 2 is an example o a Providers window for creating and maintaining information in relation to all of the providers of the rate sheets and reimbursement claims.

The Providers tab 12c allows the user to manage information on each Provider. Illustrated in FIG. 2, a Provider window 20 permits the user to enter identifying data such as the Provider's tax id, address, zip, a user defined provider code and aliases.

Figure 3:
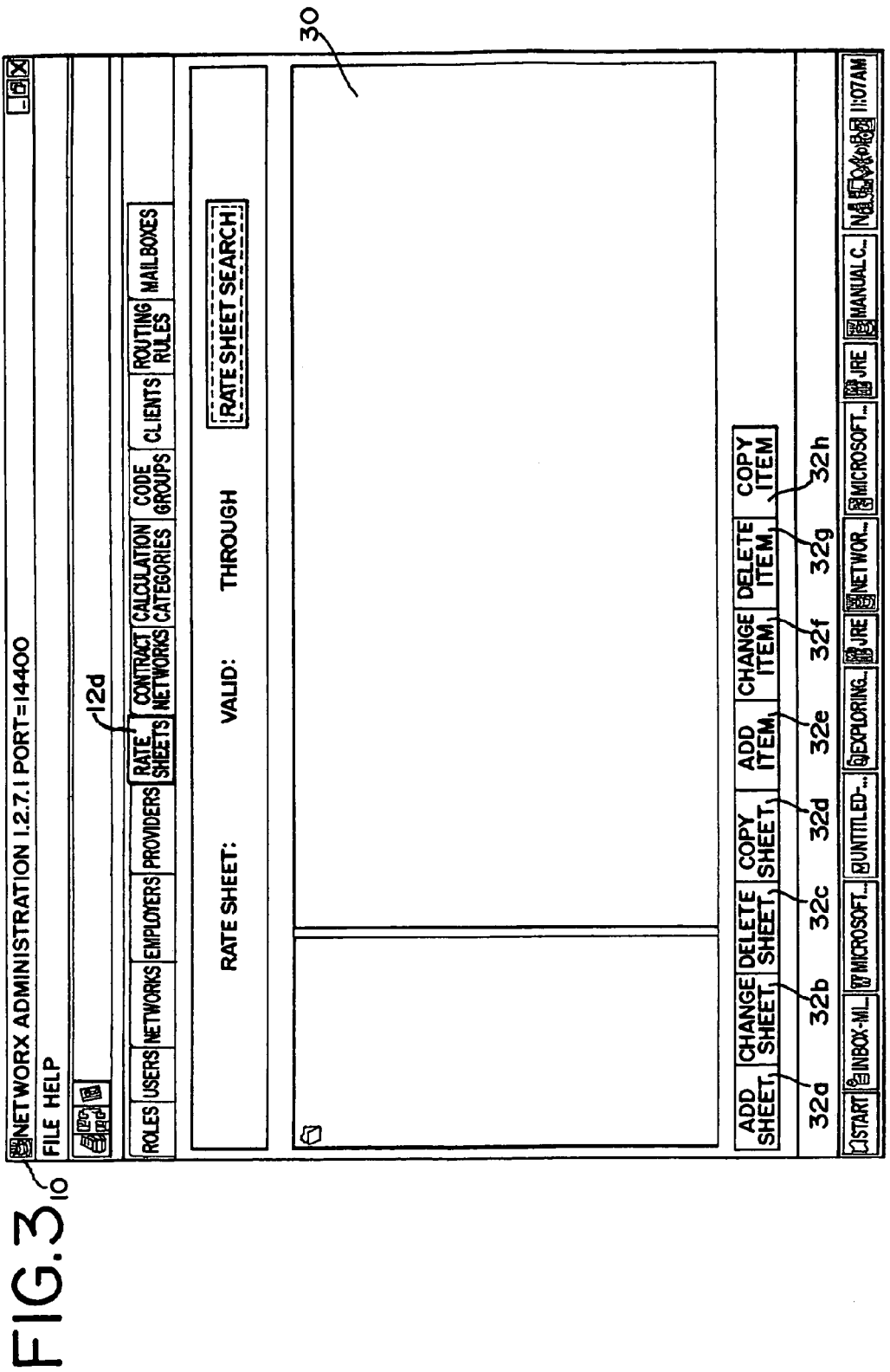
FIG. 3 is an example of a default window for the rate sheets.

When selecting the RateSheets tab 12d, shown in FIG. 1, a rate sheet window 30 opens, illustrated in FIG. 3. The rate sheet window 30 permits the user to create and manage the rate sheets. The bottom of the window contains a series of tools that provide the user with the ability to create and manage rate sheets and terms. The tools used for maintaining and creating rate sheets are Add Sheet 32a, Change Sheet 32b, Delete Sheet 32*c* and Copy Sheet 32*d*, while additional tools are used for maintaining and creating the terms of each rate sheet, such as Add Item 32*e* (or add term), Change Item 32*f*, Delete Item 32*g* and Copy Item 32*h*.

The Calculation Categories tab 12*e* opens a category window 40 and a calculation window 45, illustrated in FIG. 4. The calculation and category windows permit the user to organize and select repricing calculations for use under each category. Initially each category contains a list of pre-defined repricing calculations, which are used when creating rate terms. The user however, may further define under each category specific calculations that will be available for use when creating or editing the terms. For instance, if each rate sheet created for an Insurer only includes single level per diem calculations then the per diem category can be adjusted, using the calculation and category windows, to only allow for this calculation. As such, when entering new per diem contract terms, the only calculation available would be the single level per diem.

The Code Groups tab 12*f*, provides the user with the ability to maintain groupings of qualifying pre-defined codes. When entering in a rate sheet, each contract term is defined under a sub-section headings, for instance, Medical and ICU/CCU/NICU. Code grouping permits the user to define which codes qualify for repricing under these sub-sections. For example, when using revenue codes, the industry has determined that revenue codes 120-123 define procedures under a Medical sub-section, while the revenue codes 174 and 200-219 define procedures under the ICU/CCU/NICU sub-section. The pre-defined codes include age, ICD9 procedure and diagnosis codes, DRG codes, CPT-4 codes, revenue codes, and Provider groups (such as Surgeon, Assistant Surgeon, and Anesthesiologist). Under the code groups tab 12*f* the pre-defined code groups may be adjusted or new groups may be created to cover specific terms in a rate sheet.

The Routing Rules tab 12*g* is used to establish which mailbox, created using Mailbox tab 12*h*, reimbursement claims are routed to. For instance, after a data entry personnel enters claims into the reimbursement platform, the system may save the entered claim and route the claim, using defined routing rules, to a repricing mailbox. A second personnel may thereafter, open the repricing mailbox, retrieve the claim and reprice the claim.

C. Claim Reimbursement Platform

Figure 5:
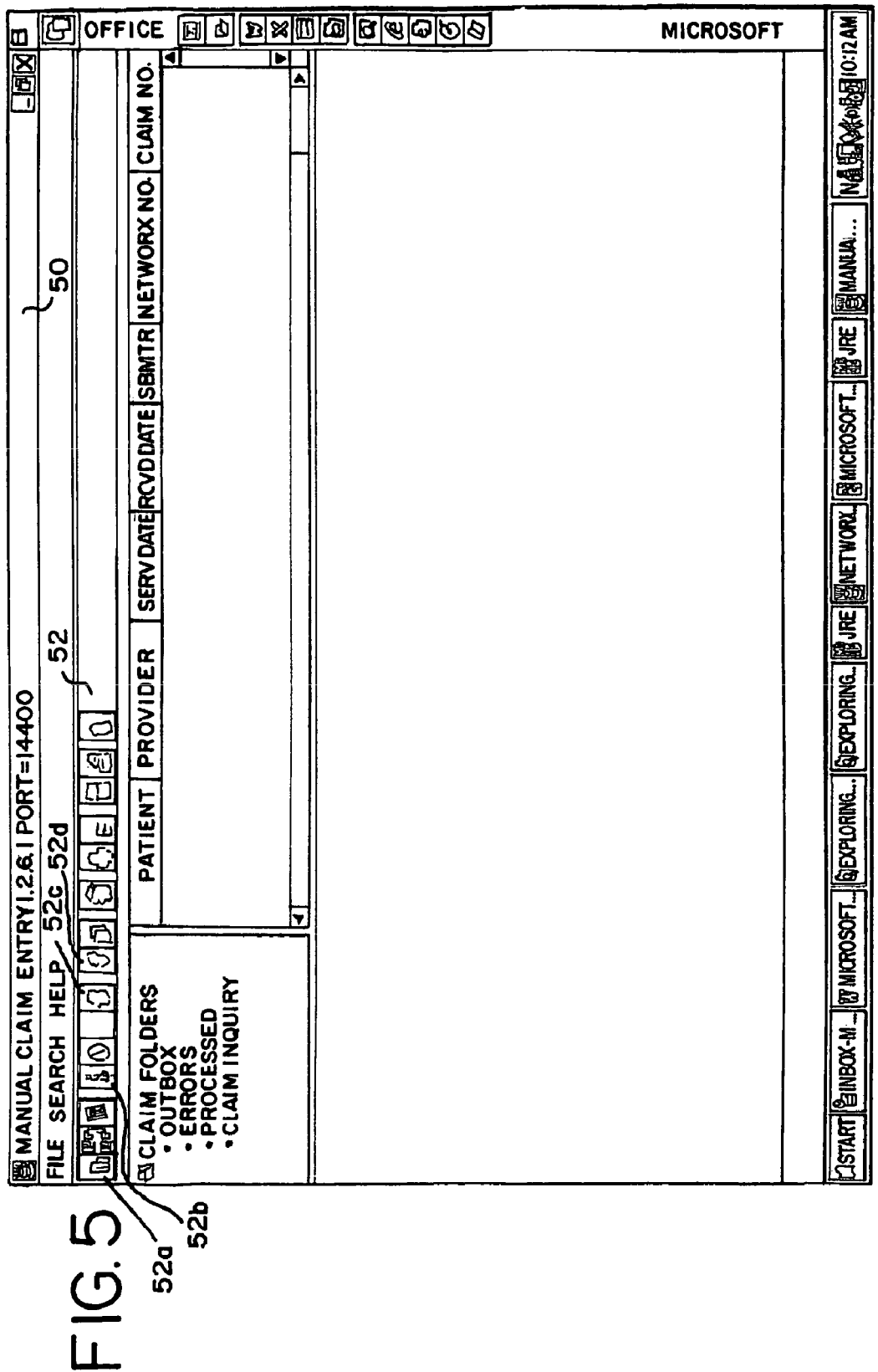
FIG. 5 is an example of a claim window used for managing and maintaining the reimbursement claims.

As mentioned above, the claim reimbursement platform is used to manage and maintain the claims. The user may create, edit and reprice the claims against the rate sheets utilizing the tools provided by the reimbursement platform. As illustrated in FIG. 5 a graphic representation of the reimbursement platform is shown in a claim window 50. A toolbox 52 located along the top of the claim window 50 contains various tools, graphically represented. The tools include, but are not limited to the following, Creating New claims 52*a*, Repricing claims 52*b*, Route claims 52*c*, and Display Repricing Details 52*d*. Similar to the Routing Rules tab 14*g*, the Insurer may route the claims to various predefined groups or mailboxes (created under the mailbox tab 12*g*) by using the Route Claims tool 52*c*.

Figure 7:
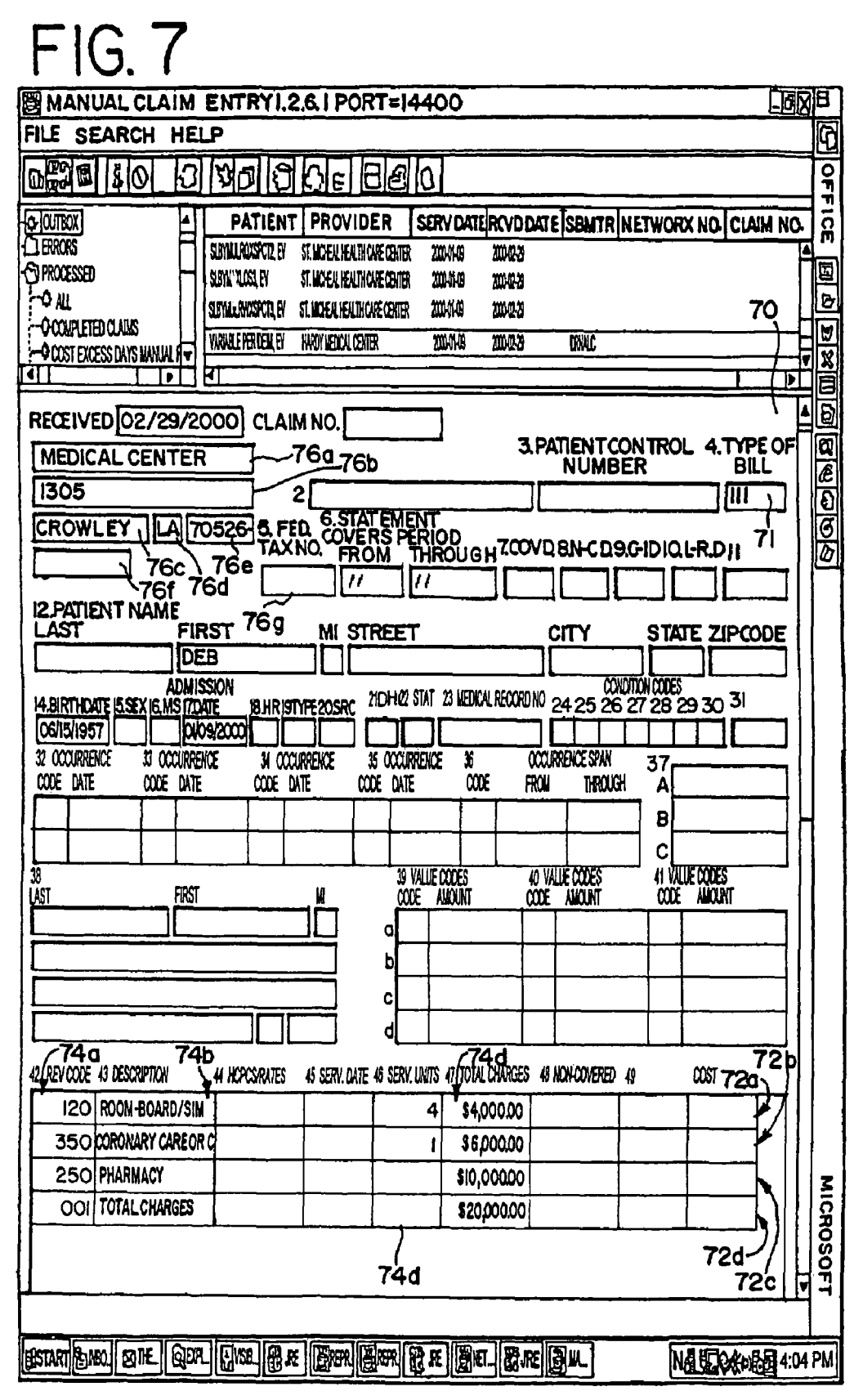

Illustrated in FIGS. 6*a*, 6*b* and 6*c*, when a new claim is to be created a new claim form window 60 is opened. Using the input devices mentioned above, a user enters in a claim to be repriced. FIG. 7 illustrates a claim 70 that has been created and saved in the system and is awaiting to be repriced. As illustrated the claim contains several claim lines, rows 72*a*, 72*b*, 72*c*, 72*d*. Listed in each row are specific revenue codes, column 74*a*, general descriptions of the codes, column 74*b*, the number of units of each code, column 74*c*, and the total charges, column 74*d*, and etc.

Figure 8:
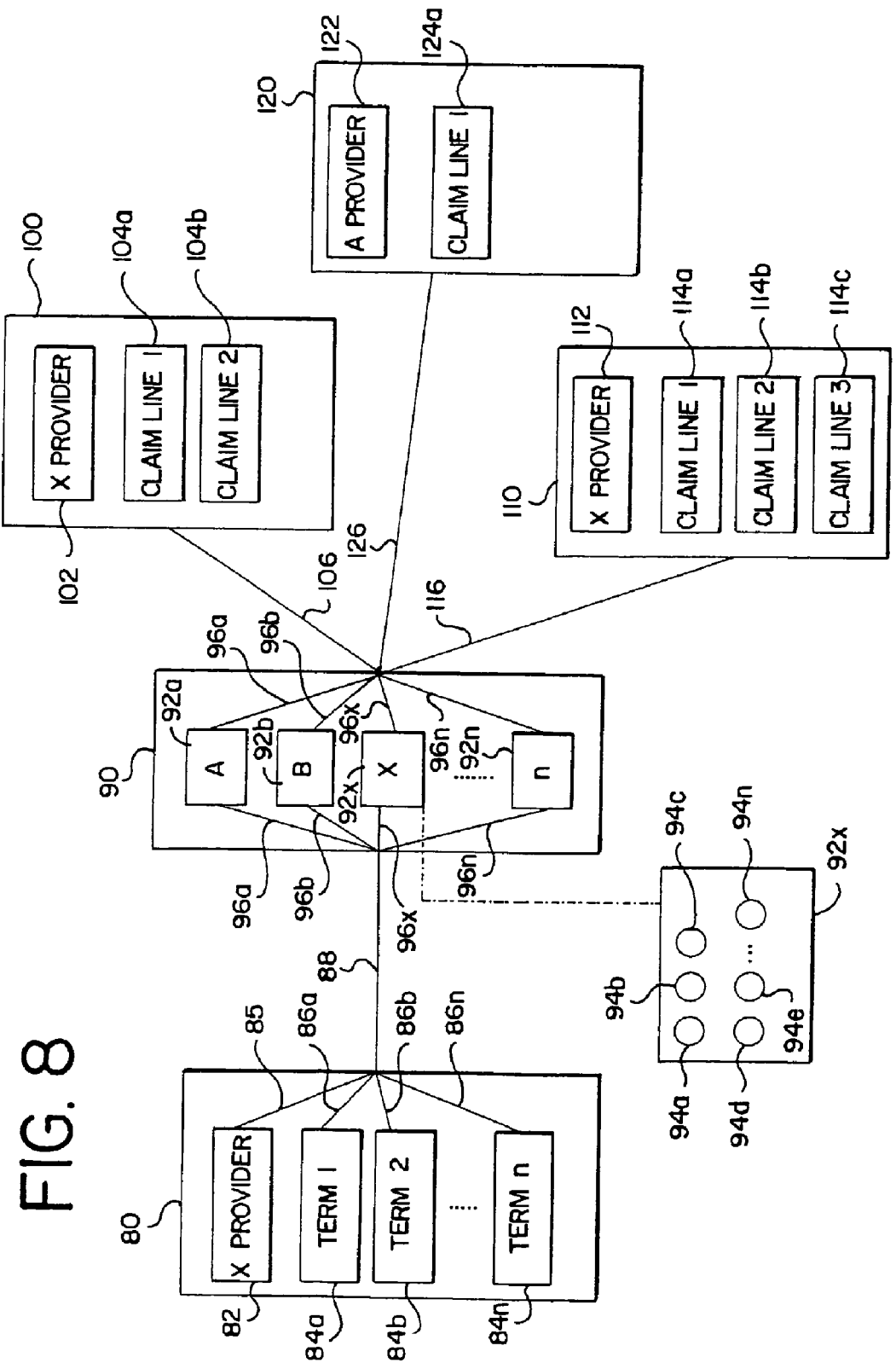
FIG. 8 is a block diagram illustrating the inter-relationship between containers, contexts and beans created by the reimbursement platform and the contracts platform in accordance with the present invention.

As mentioned above, since information is stored as beans, the information is easily shared and used by both platforms. As such, the provider beans used by the contract platform may be used and linked to claims created on the reimbursement platform, such as the information identifying a provider entered in boxes 76*a*-76*e*, FIG. 7. By way of example and as illustrated in FIG. 8, a completed contract, between Provider X and the Insurer, may be stored on the system as a RateSheet context 80. Contained within the RateSheet context 80 may be a provider container 82 identifying the provider of the RateSheet as X provider. Also included within the RateSheet context 80 are term containers 84*a* . . . 84*n* representing n terms of the contract. The RateSheet context 80, as well as the other containers within, includes logic 85 and 86*a* . . . *n* that links to the other contexts and/or beans contained within or stored globally, logic link 88.

While the information identifying X provider (i.e., Provider Code, zip, city, state, address, etc.) may be stored in the provider container 82 of RateSheet context 80, it is preferably stored in a Provider context 90. The provider context 90 has stored within containers corresponding to the providers, represented as container 92*a* corresponding to A provider; container 92*b* corresponding to B provider; . . . ; container 92*x* corresponding to the X provider; . . . ; 92*n* container corresponding to n provider; each container housing identifying beans that represent the provider's information. Closely examining the container 92*x*, which stores identifying information in relation to the X provider, the container includes identifying beans 94*a* . . . 94*n*. Each identifying bean represents a single piece of information regarding the X provider, for instance, bean 94*a* may represent X provider's zip code. As with the RateSheet context 80, the provider context includes logic links 96*a* . . . 96*n* to the provider containers stored within.

Also illustrated in FIG. 8, is three claim contexts, a first, second and third, 100, 110 and 120 respectively. The first and second claim contexts 100 and 110 represent claims submitted by the X provider and the third claim context 120 represents a claim submitted by A provider. As illustrated the first claim context 100 includes a provider container 102, identifying X provider, and 2 claim containers 104*a* and 104*b*, which store information in relation to the claim lines; the second claim context 110 has a provider context 112, identifying X provider, and includes 3 claim containers 114*a*, 114*b* and 114*c*; the third claim context 120 has a provider container, 122, identifying A provider, and a claim container 124*a*. Moreover, each claim context contains links 106, 116, 126 to the provider context 90, respectively. Since the provider information is stored within provider context 90, when the information is changed, each context that is linked thereto is automatically updated. Therefore, if the zip code, bean 94*a*, of X provider is changed while entering the second claim 110, the provider container 102 of the first claim context 100 and the provider container 82 of the RateSheet context 80 is automatically updated.

This permits multi-level interaction between contracts and reimbursement claims. Tens of thousands of contracts relating to hundreds of thousands of PPOs may be managed and organized within seconds, instead for hours. Moreover, and as described in greater detail below, the reimbursements claims may be bounced off of all of the stored contracts, to determine all governing contracts more quickly and more efficiently than prior systems.

D. Rate Sheet or Contract Creation Example

Figure 19A:
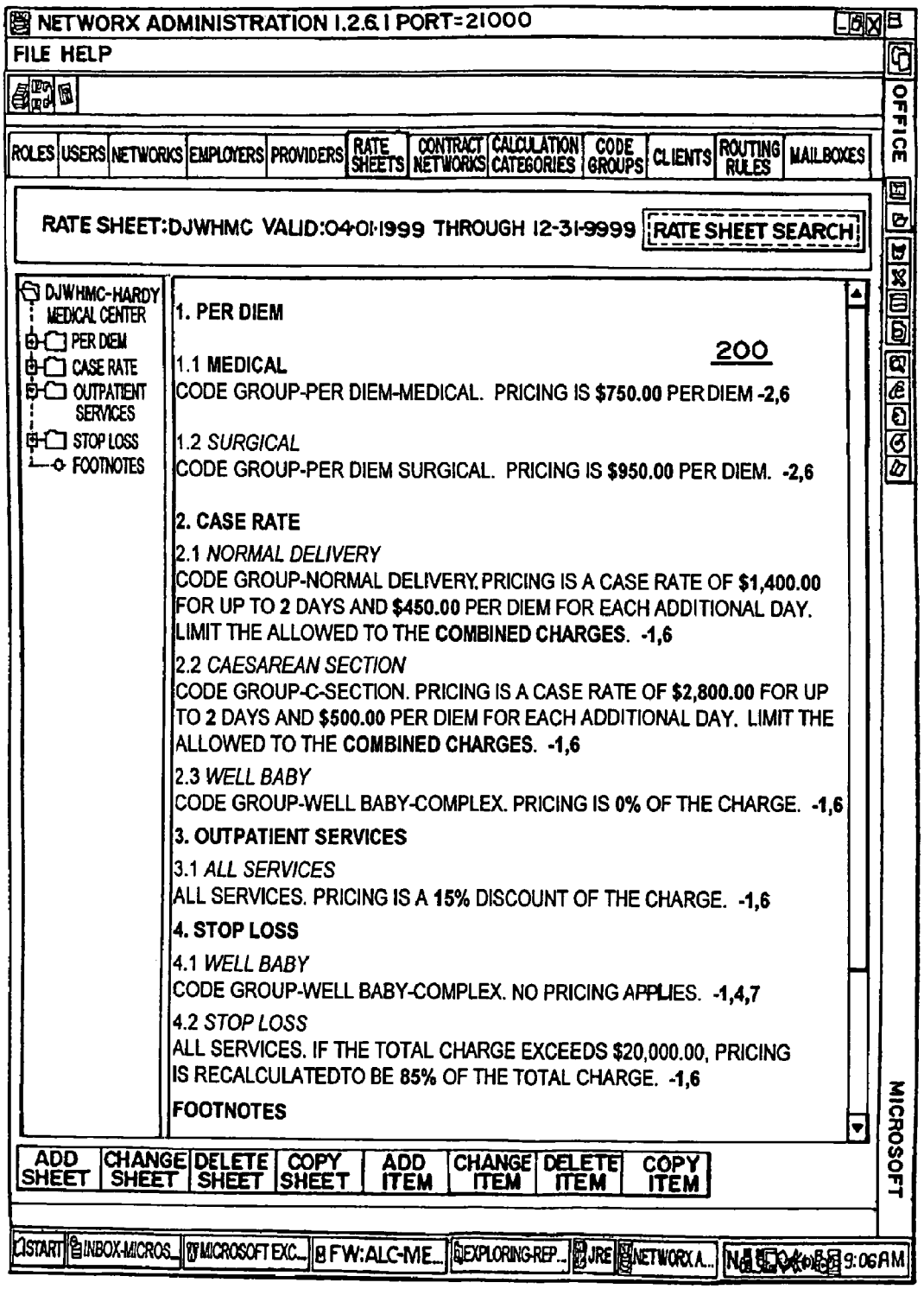
FIGS. 19A & 19B are the top and bottom screens from the Rate Sheet window containing all of the terms from the contract of FIG. 9.
Figure 19B:
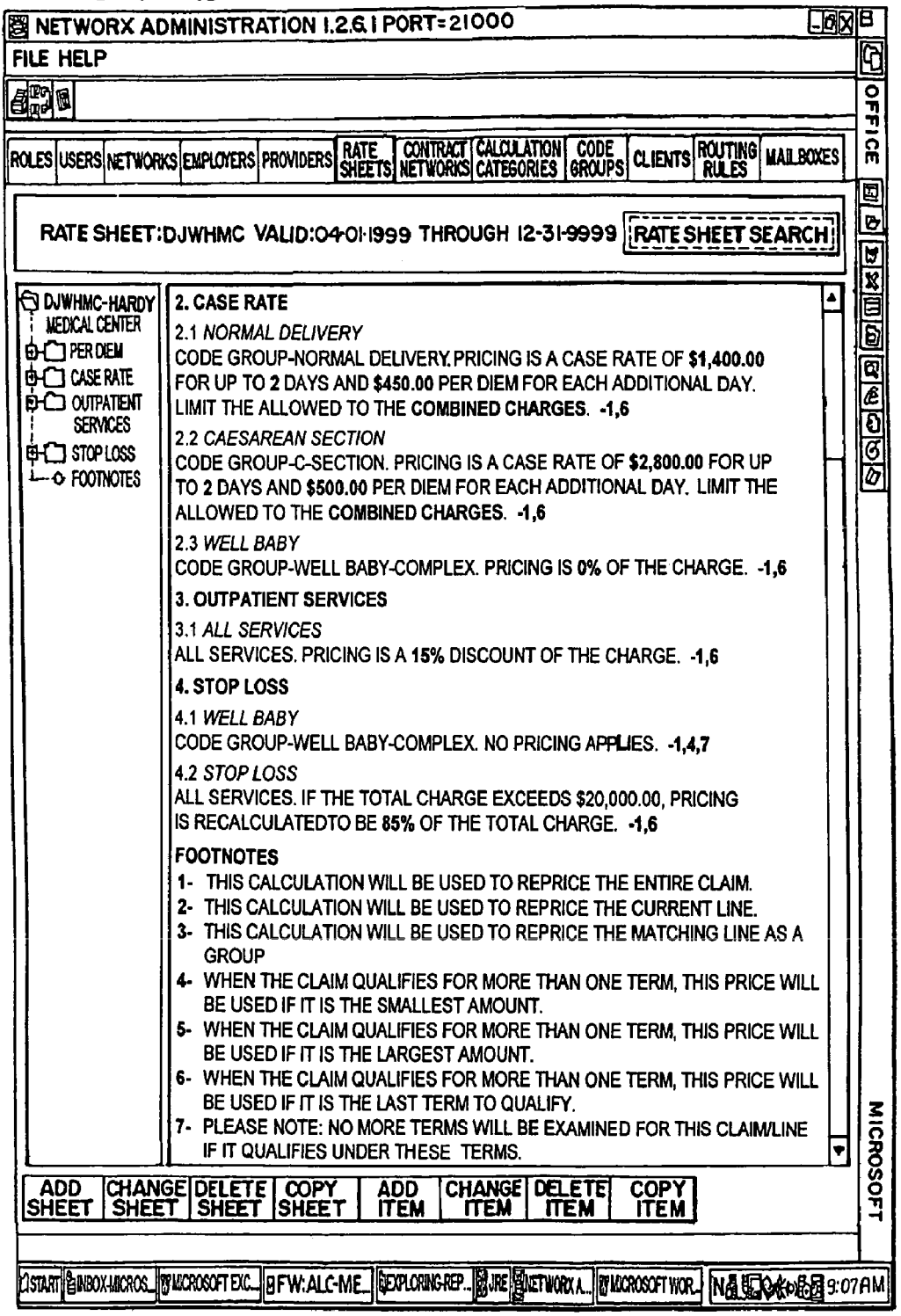

In this example, a simple Provider Contract 140, as shown in FIG. 9, is converted to a "Completed Rate Sheet" 200, shown as split screens in FIGS. 19*a* and 19*b*. As shown in FIG. 9 the Provider Contract 140 between a Medical Center and an Insurer for medical reimbursement claims contains various terms. As provided, the Provider Contract 140 defines the following terms: Medical per diem cost at $750.00; Surgical per diem cost at $950.00; Normal Delivery at $1,400.00 for 1-2 day stay case rate with an additional $450.00 charge for each additional day; Cesarean Section at $2,800.00 for 1-2 day stay case rate and $500.00 for each additional day; all other covered Inpatient Services and all Outpatient Services will be discounted at 15% from billed charges; and a Stop Loss for any case in which charges exceed $20,000 the Medical Center will be paid 85% of the total billed charges.

As mentioned above, the contract is broken down into its terms and stored as term contexts (as in FIG. 8). Each term context includes qualification, calculation, and priority beans. For example, the first term "Medical per diem cost at $750.00," includes qualification contexts which include qualification beans to the code grouping 'medical'; and the category or section 'Per Diem'. A calculation context would include beans to a 'single level calculation', and would be associated to the calculation bean of "$750.00." Additional information regarding priority conditions of this term in relation to other terms in the rate sheet is stored in the priority beans.

1. Creating a New Rate Sheet

Before repricing a reimbursement claim, a user must create a rate sheet. A Rate Sheet 200, such as shown in FIGS. 19a and 19b, was created using the contract platform, mentioned above, and using as a template the Provider contract 140, from FIG. 9.

Figure 10A:
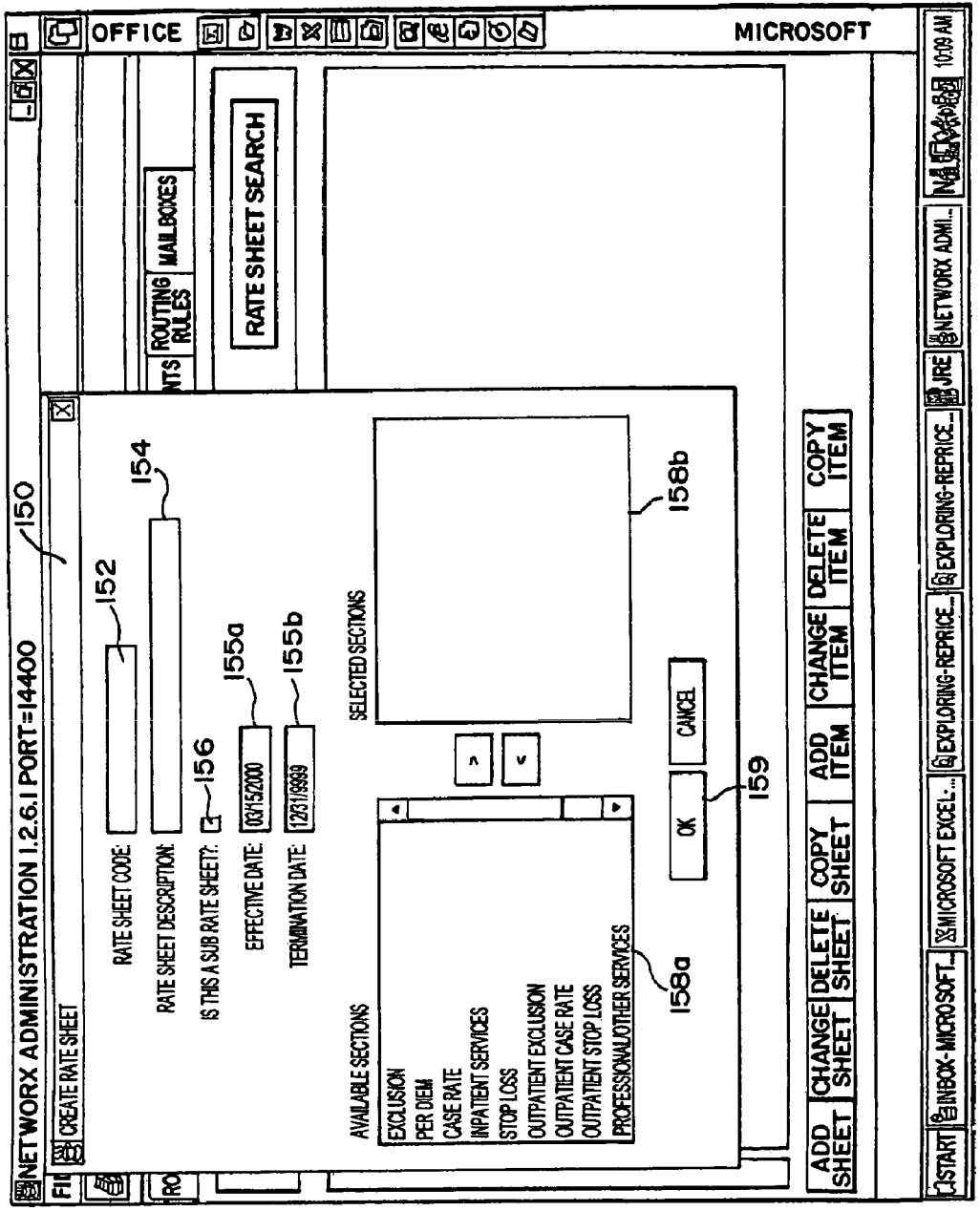
FIG. 10A is an example of a Rate Sheet window used to maintain and create the rate sheets.

To create the Rate Sheet 200 a user begins by clicking the RateSheets tab 12d on the Main Administration screen 10, shown in FIG. 1, which opens the rate sheet window 30, illustrated in FIG. 3. The user then selects the Add Sheet 32a tool, which opens a Create Rate Sheet window 150, illustrated in FIG. 10a. Information regarding the provider and the contract is entered in this screen. For instance, a rate sheet code specifically associated to a rate sheet is entered in a code box 152. This permits the user to recall specific rate sheets quickly and more efficiently. The identification or name of the provider is entered in the Rate Sheet Description box 154 and the effective dates of the contact may be entered in the date boxes 155a and 155b. Moreover, if this rate sheet is a subset of another rate sheet the user may select the sub-rate sheet box 156.

Figure 10B:
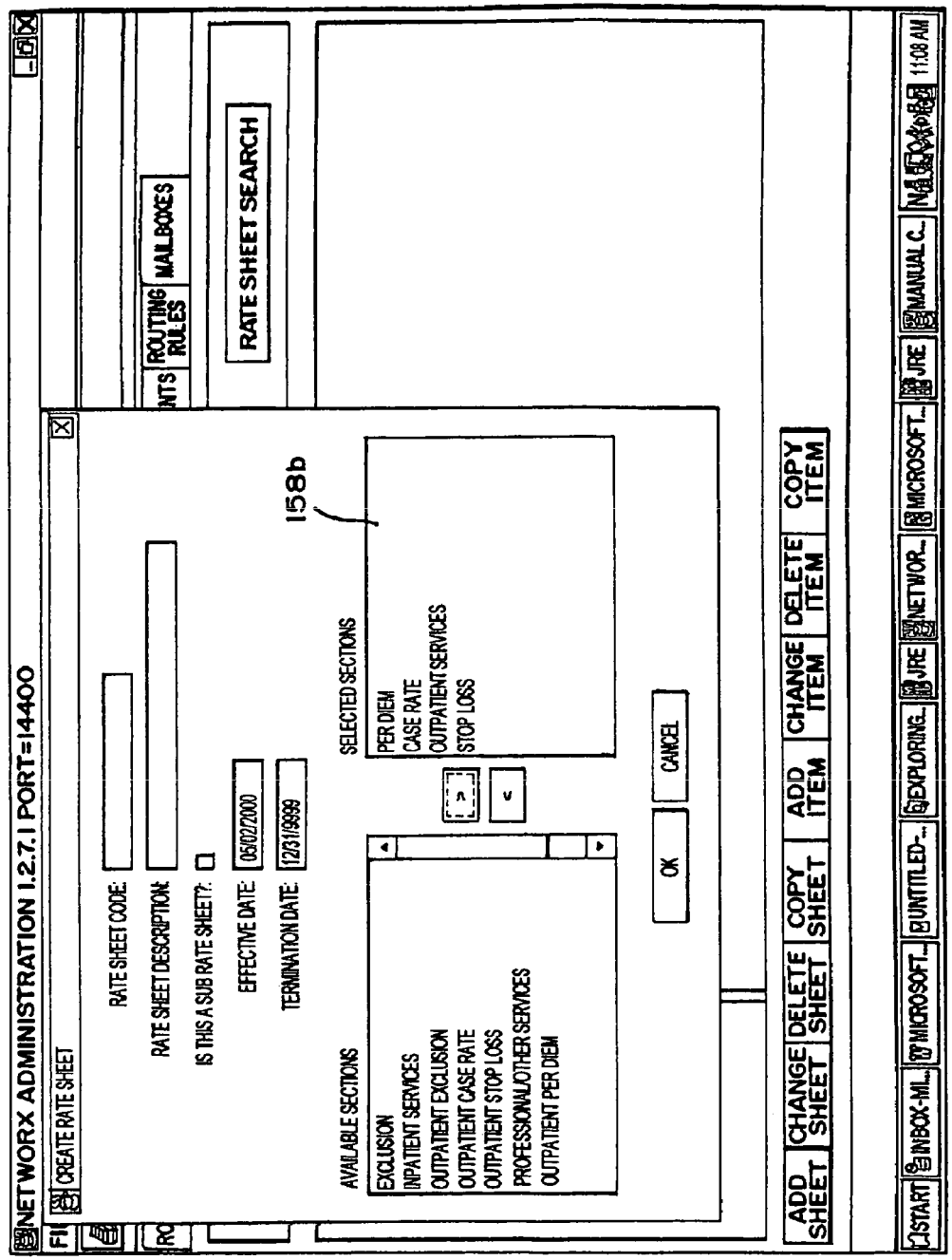
FIG. 10B is an example of the Create Rate Sheet window, which is brought about when a user begins to add a new rate sheet.

In a preferred embodiment, the terms of the rate sheet are organized or listed under pre-defined sections. These sections include Outpatient Exclusions, Outpatient Per Diem, Outpatient Case Rates, Outpatient Services, Outpatient Stop Loss, per Diem, Case Rate, Exclusion, Inpatient Services, Stop Loss and Professional/Other Services and are listed in an available sections box 158a. Moreover, since the contractual terms categorize within pre-defined sections, a flow process in which reimbursement claims can be processed and repriced may be developed, discussed in further detail below. When a rate sheet contains a term categorized under a pre-defined section, that pre-defined section is selected and added to the selected sections box 158b. When al of the pre-defined sections are selected, the OK button 159 is depressed. As illustrated in FIG. 10b, the user adds to the selected sections box 158b the Per Diem, Case Rate, Outpatient Services and Stop Loss sections, which correspond to the terms in the Provider Contract 140.

Figure 11:
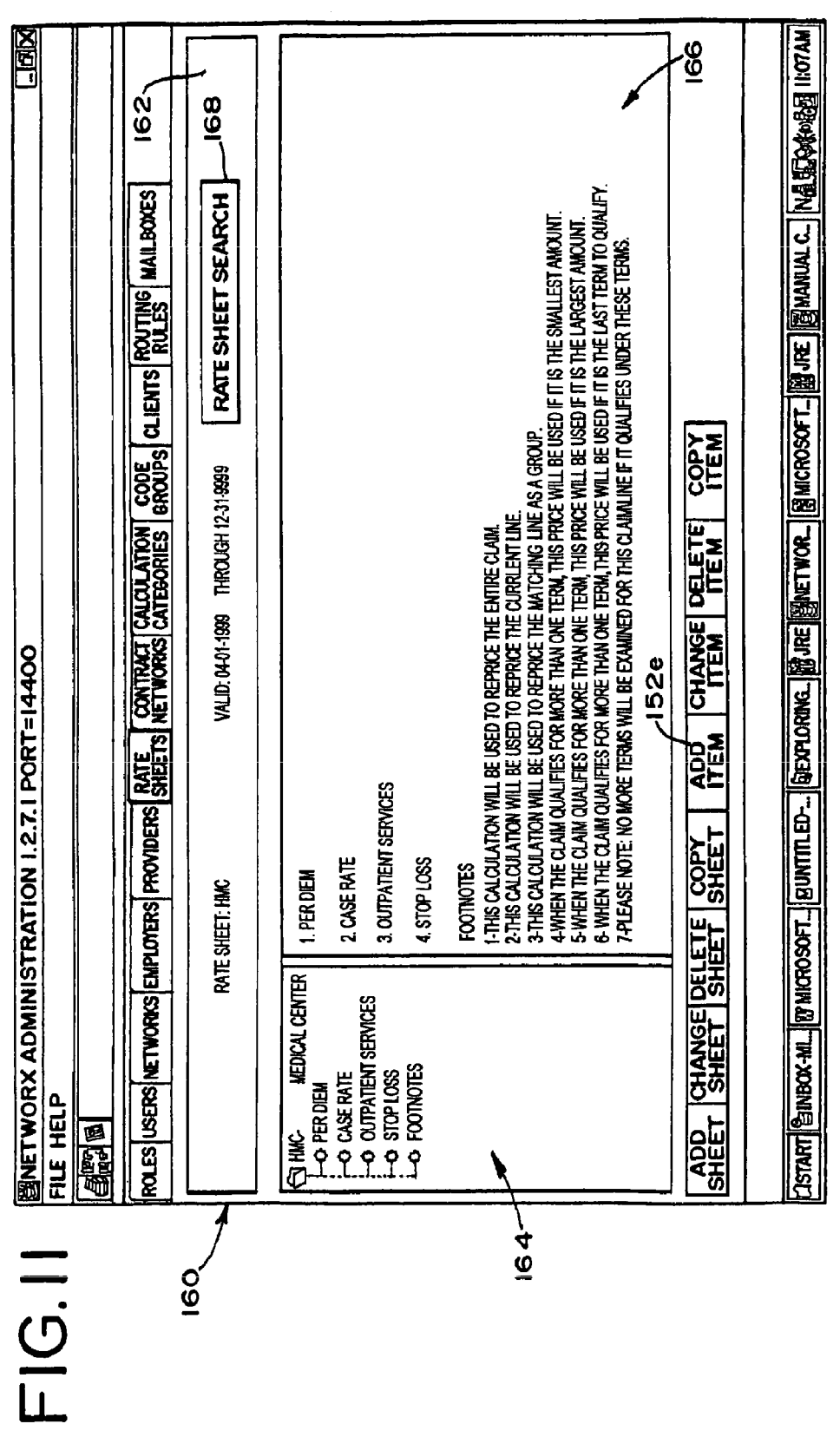

Once the OK button 159 is depressed, a rate sheet window 160 opens illustrated in FIG. 11. The rate sheet window 160 separates into a title box 162, an outline box 164 and the rate sheet box 166. The title box 162 lists the rate sheet code, the dates in which the rate sheet is valid through and contains a rate sheet search button 168. The rate sheet search button 168 permits the user to search and locate a different rate sheet. The rate sheet box 166 graphically represents the rate sheet as entered and stored by the contract platform, as well as lists the footnotes, discussed in greater detail below. As illustrated, no terms are listed under the sections since the terms have not yet been entered. The outline box 164 only lists the section and subsection headings listed in the rate sheet box 166.

2. Creating Terms

The user may now begin to enter in the terms of the contract. When no terms exist, as illustrated in FIG. 11, the user may highlight one of the pre-defined sections, in either the outline box 164 or the rate sheet box 166, and click the Add Item button 152e. If, however, a section contains terms, and a new term is to be added, the user would highlight the term, in which the new term is to follow, and then click the Add Item button 152e. This opens a Rate Sheet Terms window 170, illustrated in FIG. 12. The Rate Sheet Terms window 170 has four sub-windows a description window 172, a qualifications window 174, a calculation window 176 and a lower window 178.

The description window 172 assists the user in defining the term. The description of the term or heading is entered in description box 172b and the effective dates of the term, which may be different then the contract, may be entered into date boxes 172c and 172d. Included within the description window 172 is also a heading box 172a, which is selected when the description, in description box 172b, is a note to clarify the term or condition.

The qualification window 174 permits the user to select the type of codes associated to the term and the value of the codes. As mentioned above, the pre-defined code types, selected from code type pull down menu 174c includes, for example, ICD9 procedure and diagnosis codes, DRG codes, CPT-4 codes, revenue codes, etc. When using a specific range of codes, the code value box 174a is selected. The user then enters in a range of code values in the value range boxes 175a and 175b, illustrated in FIG. 12a. When, however, the code grouping box 174b is selected, the user selects the code group from a pre-defined group of codes from a drop-down menu 177, illustrated in FIG. 12b.

Figure 12:
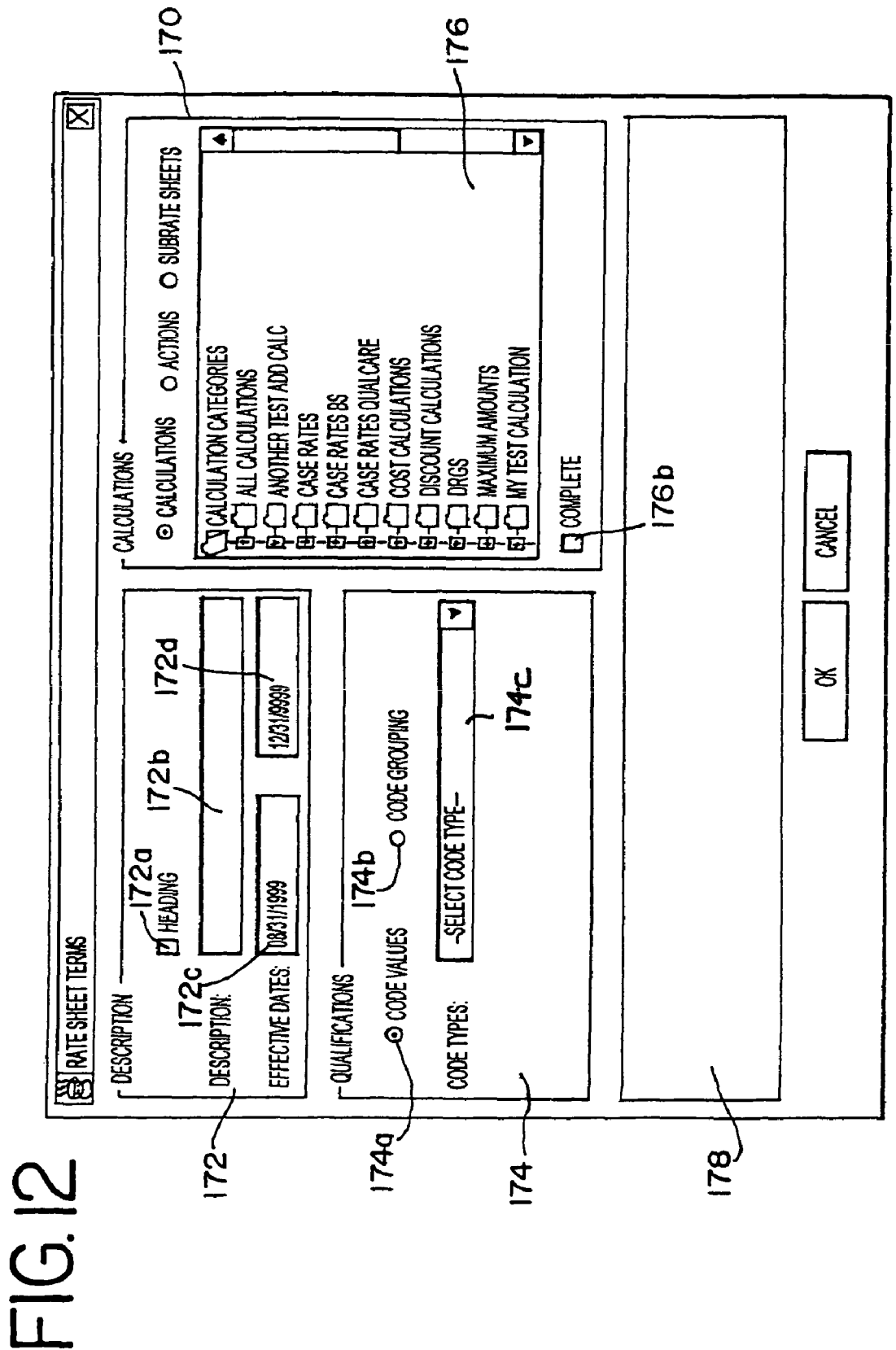
FIG. 12 is an example of the Rate Sheet Terms window used to add and edit the terms of the rate sheet.

The calculation window 176, FIG. 12, allows the user to select which calculation to use for repricing a claim or claim line, when that claim line satisfies the criteria defined in the qualification box 174. The user may select from any calculation listed under the various categories defined in the calculation box 176. As mentioned above, the calculations available may be limited under the calculation categories tab 12e, illustrated in FIG. 4. The calculation window 176 also includes a complete box 176b. When a term is a final repricing within a section then the user may select the complete box 176b. This prevents the repricing of a qualifying claim line under another term within that section, however, it does not prevent the repricing of the qualifying claim line under another section. If the complete box 176b is unchecked, the system will continue to search through the rest of the terms within the section and may reprice the claim using a different term.

Preferably, the amounts, days and percentages of each calculation are user-defined in order to customize the calculation for each term. For example, a surgical single level per diem charge in a rate sheet may include: "a surgical charge of $950 a day." In this instance, only the amount of the charge is modifiable. To change this term to for instance, "a surgical charge of $950 for the first 2 days and $500 thereafter" the category must be changed to a 2 level per diem charge. The pre-loaded categories include, but are not limited to, allowed, maximum allowed, cost, percentage, discount, per diem, unit, case rate, DRG (diagnosis related groups), reasonable and customary, schedule, stop loss and no calculations.

Illustrated in FIG. 13a and in accordance with the Provider contract 140 the first term, "Medical Per Diem repriced at $750.00 a day," has been entered. As illustrated. the description window 182 contains information in relation to the term. The description box 182a contains the term "Medical" and within the date boxes 182b and 182c are effective dates. The qualifications window 184 indicates that this term uses code grouping by selecting the code grouping box 184a. The type of codes selected in the code type box 184c is revenue codes with the pre-defined code group being "Per Diem—Medical," defined in the code group pull down menu 184b. The calculation window 186 indicates that the calculation assigned to this term is a single level per diem calculation. Upon selecting a calculation from the calculation window 186 the system generates and displays each calculation as an English language paragraph in the lower window 188 with a series of calculation boxes 188a interspersed in the paragraph. The user enters in a price of "$750.00" in the per diem calculation box 188a. Lastly, the user defines the priority of this term in comparison to other terms defined under the Per Diem section. This is accomplished by selecting a pair of priority notes, or footnotes, from the footnote pull down windows 189a and 189b, discussed in further detail below.

When the term is complete, the user clicks the OK button 190. The system will then convert the entered information into beans and store the beans in a container. As illustrated in FIG. 9, the container may be stored in a rate sheet context, which contains a plurality of containers, each storing information in relation to a specific term. This permits the user to change, edit, add and delete terms without having to retype or recreate a new rate sheet, only the specific bean or container has to be changed.

Referring now to FIG. 13b, the second term "Surgical at $950.00 a day" from the Provider contract 140 is entered in rate sheet term window 190. As in the Medical term FIG. 13a, the Surgical term uses revenue codes, in code type box 192a and the pre-defined code group "Per-Diem—Surgical" defined in the code group pull down menu 192b. In this instance the revenue codes overlap, the pre-defined revenue codes for both Per-Diem—Medical and Surgical terms include the codes 110-113 and 120-123. During the repricing process, claims with a revenue code of 111 for example, will qualify for both the Medical and Surgical terms. Since the Surgical term is listed last in the Per-Diem section all claims with overlapping revenue codes reprice at the Surgical rate of "$950.00", defined in calculation box 192c. One way to differentiate a surgical service from medical care is by the presence of an ICD9 procedure code on the claim. To build the Surgical term with both the revenue code and an ICD9 procedure code is to add a subrate sheet 198 marked in a subrate sheets box 194. The subrate sheet allows for the creation of more than one qualifier, e.g. a revenue code qualifier and an ICD9 procedure code qualifier. During the repricing process, all claims with an overlapping revenue code and no ICD9 procedure code reprice with the Medical term, while all claims with an overlapping revenue code and an ICD9 procedure code reprice with the Surgical term. As illustrated in FIG. 13c, the rate sheet window 195 now contains the two subsections, Medical and Surgical under the section per Diem. The system, using the beans entered from the rate sheet term window, generates and displays each term as a paragraph.

Illustrated in FIGS. 14-18 the remaining terms are entered into the Rate Sheet. As shown, the system generates and displays in the lower window different paragraphs depending upon the calculations chosen in the calculation window. For instance, in specific reference to FIG. 14, when the calculation "Case Rate plus Per Diem, Limited by Charge" was selected, corresponding calculation boxes, 197a, 197b, 197c and 197d become available to the user. Similarly, this is illustrated in FIGS. 15-18. As shown in FIGS. 19a and 19b the completed Rate Sheet 200 shows each section with subsections defining the terms of the Provider contract 140. Similarly, illustrated in FIG. 20, the completed Rate Sheet 200 is displayed as a hardcopy printout.

E. Priority Footnotes

As mentioned above, each term has a pair of corresponding footnotes or priority notes, shown in FIG. 20. The footnotes associate the priority of a term within a section only, and not the entire rate sheet. moreover, each tmer includes at least two priority notes, one priority note is included from a first set and a second priority note is included from a second set. The first set of priority notes includes: (1) this calculation will be used to reprice the entire claim; (2) this calculation will be used to reprice the current line (or claim term) and (3) this calculation will be used to reprice the matching line as a group. The second set of priority notes includes: (4) when the claim qualifies for more than one term, this price will be used if it is the smallest amount; (5) when the claim qualifies for more than one term, this price will be used if it is the largest amount; and (6) when the claim qualifies for more than one term, this price will be used if it is the last term to qualify. Moreover, if the complete box 176b illustrated in FIG. 12 is selected a seventh priority note is attached to the term, (7) no more terms will be examined for this claim/line if it qualifies under these terms.

The first set of priority notes, relating to (1), (2) and (3) listed above define how a calculation in the rate sheet 220 will be applied to the claim 210. The first priority note states that if a contractual term applies to a claim line, then the corresponding calculation will be used against the entire claim not just the claim line. For instance, Per Diem and Case Rate Sections will typically reprice the entire claim because all claim lines or services listed in a claim will be in relation to the per diem or case rate procedure. The second priority note "this calculation will be used to reprice the current line" reprices only claims lines that have specific code values that match the codes defined under the qualifications. Under this priority note, the calculation container associated to a qualifying or matching contractual term would apply to the matching claim line only. For example, when a claim contains only various inpatient services, only the qualifying claim lines will be subject to repricing under an inpatient service section, the other non-qualifying claim lines will not be repriced. The third priority note "this calculation will be used to reprice the claim line as a group" will apply a calculation to a group of claim lines. When a claim line qualifies under a term that includes the third priority note, the repricing engine continues to check other claim lines. If the repricing engine matches additional claim lines under the same term, the claim lines are grouped together and repriced one under the term's associated calculation.

The second set of priority notes, (4), (5) and (6) define the priority of the terms within each pre-defined section. Under each priority note, the repricing engine will determine whether a claim line qualifies under more than one term listed under a section. When a claim line qualifies under a term listed in a section, the repricing engine automatically checks the other terms listed in the section. When the claim lines qualifies under one than one term, the repricing engine will, according to the (4) and (5) priority notes, calculate a reimbursement amount for each matching or qualifying term. When a matching term includes the fourth priority note "... this price will be used if it is the smallest amount," the repricing engine begins to compare the reimbursement amount for each matching term. The repricing engine then will reprice the entire claim, claim line or group of lines (depending upon the first set of priority notes) under the term with the fourth priority note when the reimbursement amount for this term is the smallest amount when compared to the other reimbursement amounts. Similarly, the repricing engine will reprice under a term associated to the fifth priority note "... this price will be used if it is the largest amount," when the reimbursement amount for this term is the largest amount when compared to the other reimbursement amounts. If a matching term is associated to the sixth priority note "... this price will be used if it is the last term to qualify," the repricing engine does not need to calculate the reimbursement amounts for each qualifying or matching term. The repricing engine only needs to determine which matching term is the last term in the section and then determine the reimbursement amount for such last term.

As mentioned above, the seventh priority note "no more terms will be examined for this claim/line if it qualifies under these terms" is assigned to terms in which the complete box 176b illustrated in FIG. 12 is selected. As such, when a claim line applies under a term with a seventh priority note associated therewith, the repricing engine does not have to search other terms in the section to determine if any more within the section apply.

F. Repricing Against the Priority Notes

For further explanation of the priority notes, reference is made to FIG. 21, a claim context 210 created using the reimbursement platform has four claim lines 212, 214, 216 and 218 respectively. Each claim line contains claim beans storing information in relation to the claim line, for instance, the revenue code, bean 212a, the number of units 212b, the submitted charge 212c, etc. Moreover, a RateSheet 220 associated to the Rate Sheet 200, illustrated in FIG. 20 contains five sections a first section 222, a second section 224, a third section 226, a fourth section 228 and a fifth section 229. The first section 222 (corresponding to the Inpatient Per Diem section in Rate Sheet 200) contains a $1^{st}$ term context 222a (corresponding to the Medical term) and a $2^{nd}$ term context 222b (corresponding to the Surgical term). The second section 224 (corresponding to the Inpatent Case Rate section) contains a $3^{rd}$ term context 224a (Normal Delivery term) and a $4^{th}$ term context 224b (C-section term). The third section 226 (Inpatient Services section) contains a $5^{th}$ term context 226a (All Other Inpatient Services term). The fourth section 228 (Outpatient Services section) contains a $6^{th}$ term context 228a (All Other Outpatient Services term) and the fifth section 229 (Stop Loss section) contains a $7^{th}$ term context 229a (Stop Loss term). Moreover, each term context contains a plurality of containers that store a plurality of beans relating to the description, qualification, priority and calculations of the term. For example, the $1^{st}$ term context 222a has a plurality of containers, a description container 230, a qualification container 232, a category container 234, a calculation container 236, a plurality container 238, as well as a hierarchy container 240. Each container may also store a plurality of beans; for instance, the description container 230 may have three beans, a heading bean 230a and two date beans 230b and 230c. As mentioned above, each container and each bean may be accessed and changed independent of the other containers and beans.

As illustrated in FIG. 20 and in correlation to FIG. 21, the second section 224 (Inpatient Case Rate section) includes the $3^{rd}$ and $4^{th}$ terms 224a and 224b respectively (corresponding to the Normal Delivery term and the C-section term respectively). Each term contains a plurality container with the second and sixth priority notes. As such when repricing for instance the claim context 210 against the RateSheet 220 the repricing engine begins to compare each claim line against each term. If the line one 212 qualifies under the $3^{rd}$ term 224a then because the $3^{rd}$ term includes the sixth priority note the repricing engine will continue to check the $4^{th}$ term 224b, to determine if the $4^{th}$ term also matches. If the $4^{th}$ term 224b does match then the repricing engine will reprice the entire claim context 210 under the $4^{th}$ term 224b because the $4^{th}$ term includes the first priority note "... used to reprice the entire claim." If the $4^{th}$ term 224b does not match then the repricing engine will reprice the entire claim context 210 under the $3^{rd}$ term 224b, because the $3^{rd}$ term includes the first priority note. Similarly, if while repricing claim context 210, claim line one 212 matches the $5^{th}$ term 226a (All other Outpatient Services term), the repricing engine will reprice only line one 212, because the $5^{th}$ term 226a includes the second priority note "... used to reprice the current lilne.) The repricing engine however, will continue to compare the other claim lines to determine if the other claim lines qualify under another term. As such, if line two 214 qualified under the $4^{th}$ term 224b, the repricing engine would reprice the entire claim and reprice the reimbursement amount for line one 212 with the reimbursement amount for the entire claim.

G. Claim Repricing Against RateSheets

Figure 22:
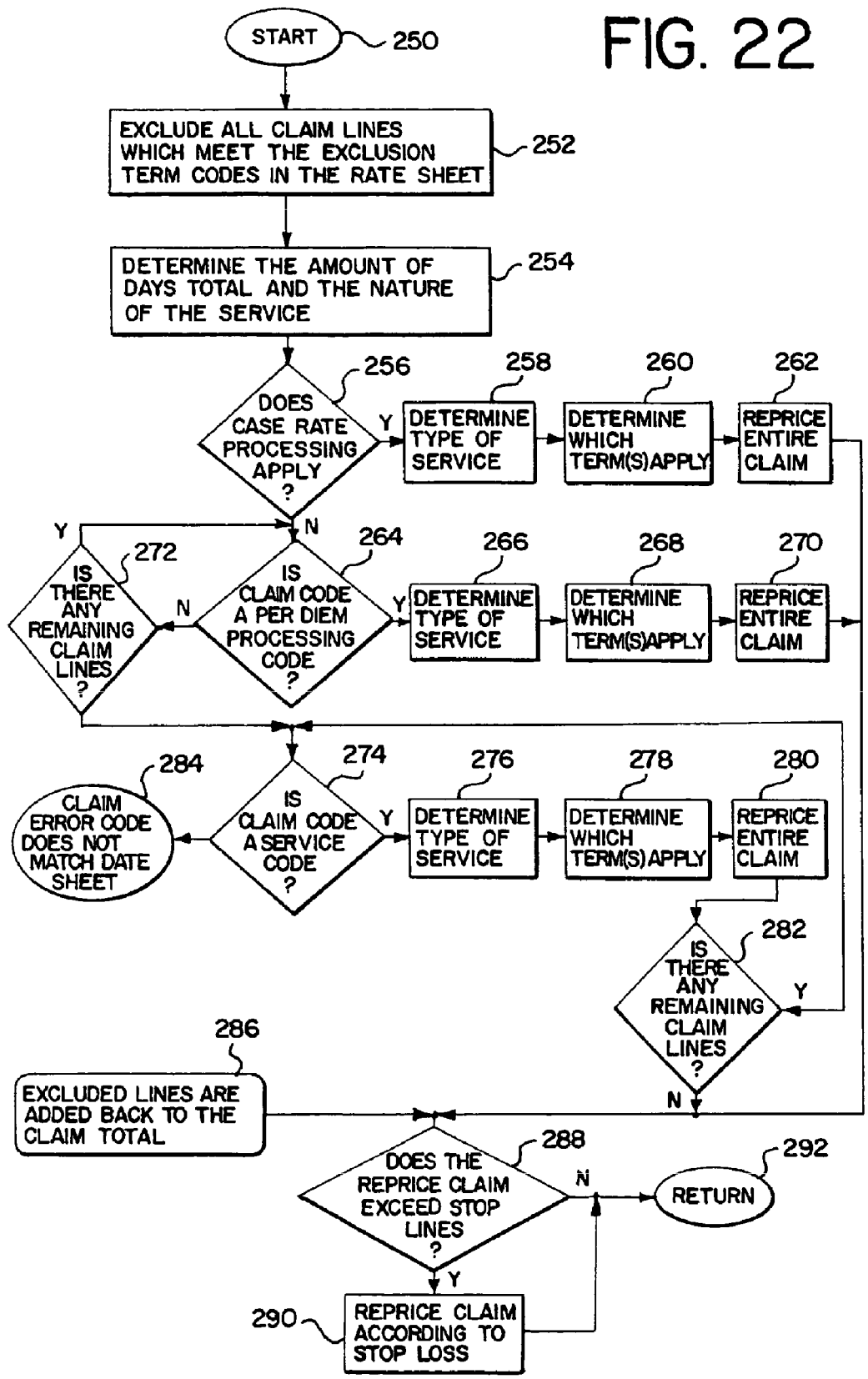
FIG. 22 is a flow diagram illustrating the processing flow used to organize the pre-defined sections.

In order to ensure that each claim is processed uniformly under any given rate sheet the contract platform attaches priority conditions to the available predefined sections, mentioned above. FIG. 22, illustrates a flow diagram, representing the processing flow the repricing engine uses in organizing the predefined sections for the repricing of a claim.

Starting with step 250, the method may begin by excluding any claim codes from the claim that are substantially equal to any codes listed in the exclusion sections of the rate sheet, step 252. These codes are temporarily excluded from the repricing of the entire claim, and are added back to the claim after the claim has been repriced, step 286. Following step 252, the method then continues to determine the nature of the service, for instance the amount of days and/or the quality of care, step 254. This provides the method with the ability to process the claim under the correct amount of days. Next in step 256, the method analyzes the claim under the Case Rate section. The method sequentially compares the claim codes and determines if any of the claim codes substantially equal any of the codes defined in the contractual terms listed in the case rate section. If a claim code falls under the case rate section of the rate sheet the method determines the type of service, whether the claim code qualifies as an outpatient or inpatient, step 258. The method then determines which term(s) apply, step 260, by determining the priority of the terms. Since terms defined under the case rates section are applied to the entire claim, the method, based upon the qualifying term(s), will reprice the entire claim, step 262.

Following step 256, if the claim codes do not match the codes defined under the terms of the case rate section, then the method determines if the claim line qualifies under the Per Diem section, step 264. If a claim line (containing a claim code) is substantially equal to the codes listed under the Per Diem section, the method determines whether the claim codes qualify as outpatient or inpatient, step 266. Next in step 268, the method determines which term(s) within the Per Diem sections apply and then reprices the claim line based upon the applicable term(s), step 270. If the claim line does not equal any of the codes, step 264, the method will continue to check the other claim lines, step 272, until the entire claim has been reviewed.

When the entire claim has been checked, and none of the claim lines, contain codes that substantially equal the Per Diem rate sheet codes, the method continues to sequentially compare the claim lines to the terms defined under the Service section, step 274. If a claim line contains a claim code which falls under the Service sections, the method determines which type of services, inpatient or outpatient, apply, step 276, and then determines which term(s) apply, step 278. Based upon the priority notes and any priority conditions the method reprices the claim line under the applicable term(s), step 280. Next, the method determines if there are any remaining claim lines, step 282, if so the method returns to step 274, and determines if the claim line can be repriced under the service code. If, following step 274, a claim line does not match any service code the method will error, step. 284, because the claim code did not match any code on the rate sheet. Under this circumstance, the claim would probably be forwarded to a mailbox according to the routing rules, previously mentioned.

Following steps 262, 270 and 282, the method adds the excluded lines back to the repriced claim total, step 286. The method continues thereafter to determine if the repriced claim exceeds any stop loss, step 288, defined by the rate sheet. If so, the method reprices the entire amount according to the stop loss, step 290. If the stop loss is not met and following the stop loss repricing, step 290, the method may return, step 292.

H. Claim. Repricing Example

Referring now to FIG. 23, the repricing engine using this processing flow may begin to reprice claims, for instance repricing the completed claim 70 illustrated in FIG. 7 repriced against the Rate Sheet 200 illustrated in FIG. 20. As shown in FIG. 7, the completed claim 70 includes four claim lines, 72*a*, 72*b*, 72*c* and 72*d*. Each claim line has a claim code listed in column 74*a*. Claim line 72*a* for Room and Board includes 'claim code 120' and is priced at $4,000 for 4 units (or four days). Claim line 72*b* includes 'claim code 350', which represents coronary care, and is priced at $6,000. Claim line 72*c* has 'claim code 250', which represents Pharmacy and is priced at $10,000. Finally, claim line 72*d* has 'claim code 001' which represents total charges of $20,000.

When the claim is repriced, the repricing engine, following the processing flow of FIG. 22, can logically reprice the completed claim 70. Since there are no exclusions in the Rate Sheet 200 (FIG. 20), the method may move to determine the amount of days, step 254. By calculating the units charged in the Room and Board claim line 72*a*, the method can determine that the amount of days is four. The method then moves to determine which sections in the Rate Sheet 200 apply. Reviewing the Case Rate section, step 256, the method logically determines that the codes listed in the completed claim 70 may not be categorized under neither the Normal Delivery Case Rate or the C-Section Case Rate, FIG. 20. As such the method continues, step 264, to determine whether any claim codes qualify under the Per Diem Section. The first claim line 72*a*, includes a revenue Claim code of 120, which falls under the code grouping defined under the Medical term. The method then must determine the type of service provided, inpatient or outpatient, step 266. Since the completed claim 70 included a bill code of '111' in box 71, the method determines that this claim is for inpatient services. If the box 71 included the bill code '112' the method would have determined that the claim was for outpatient services.

Generally the method, determining the nature of the services, will sequentially search all contractual terms listed under the inpatient per diem section and determine which term(s) apply, step 268, also shown in a sub-processing flow diagram of FIG. 23. Sequentially analyzing the terms, the method first determines whether the claim line qualifies for repricing under the first contractual term listed under the Per Diem Section, step 268*a*. If the claim line does qualify the method identifies the term as a matching term and determines any priority conditions associated to the matching term, step 268*b*. The priority conditions include for instance the priority notes and the hierarchy of the terms listed in the section. Thereafter the method determines if there are any additional contractual terms under the section, step 268*c*. If there is another contractual term the method return to step 268*a*. When there are no longer any additional contractual terms, step 268*c*, the method begins to eliminate matching terms which are excluded by the priority conditions, step 268*d*. The claim line is then repriced under the non-eliminated matching terms, step 270*a*, and then the method may return to the processing flow illustrated in FIG. 22.

More specifically, and in reference to repricing the completed claim 70 under the Rate Sheet 200, the method determines if the first claim line 72*a* qualifies under the Medical contract term, the first contractual term, step 268*a*. Since the claim code, listed in column 74*a* of the first claim line 72*a*, of '120' equals a qualification code within the range of the pre-defined Medical revenue codes, the method determines that the claim line qualifies under this contractual term. The method will identify the Medical term as a matching term and will determine any priority conditions. The priority conditions for the Medical term include the priority notes attached thereto. The method continues by determining if additional contractual terms are listed under the Per Diem section, step 268*c*. Since the Surgical term is also listed under this section, the method will determine if the claim line also qualifies under the Surgical term, return to step 268*a*. Even though the claim code equals a qualification code within the range of the pre-defined Surgical revenue codes, the claim does not include any CPT4 Procedure codes and therefore the claim line does not qualify under the Surgical term. Since there are no more contractual terms listed under the Per Diem section, the method continue to eliminate any matching terms which are excluded by priority conditions, step 268*d*. The priority conditions attached to the Medical term include the priority notes: "This calculation will be used to reprice the current line" and "when the claim qualifies for more than one term, this price will be used if it is the last term to qualify." Since the claim only qualified under one term, the method will have no terms to eliminate and will reprice the claim under the Medical term, step 270*a*. Under the Rate Sheet 200, the claim line would be repriced at $750.00 a day, multiplied by the four units or days for a total of $3,000. Returning to step 288, FIG. 22, the method would add any excluded claims, which in this example there was none, and determine if the stop loss section applied, step 288. The stop loss term as illustrated will only apply if the total amount of the repriced claim exceeds $20,000, which it does not, therefore the method may return, step 292.

Under this processing flow of FIGS. 22 and 23, the other claim lines would be bundled together under the Medical Per Diem section, such that the prior total of $20,000 would be subjected to repricing to the new amount of $3,000. As seen in FIG. 24, the nature of the repricing can be graphically displayed in Repricing window 300, which describes that the claim code (revenue code) of 120 represents a Medical Per Diem charge with four units (days), as such the original charge of $20,000 was discounted $17,000 to a repricing of $3,000.

Even if the claim was unbundled into four separate claims, one claim for each claim line, the repricing engine will identify the four separate claims as originating from the same provided service. By searching the patient, days of care provided, the nature of the care, and the services performed the repricing engine will identify the four unbundled claims as a single claim, and reprice the group of claims as a single claim. In the alternative, under various reasons, a claim once entered may need to be unbundled into separate claims. As such the repricing engine, can unbundle the claim into separate claims, separate the claim codes accordingly and reprice the unbundled claims.

Figure 25A:
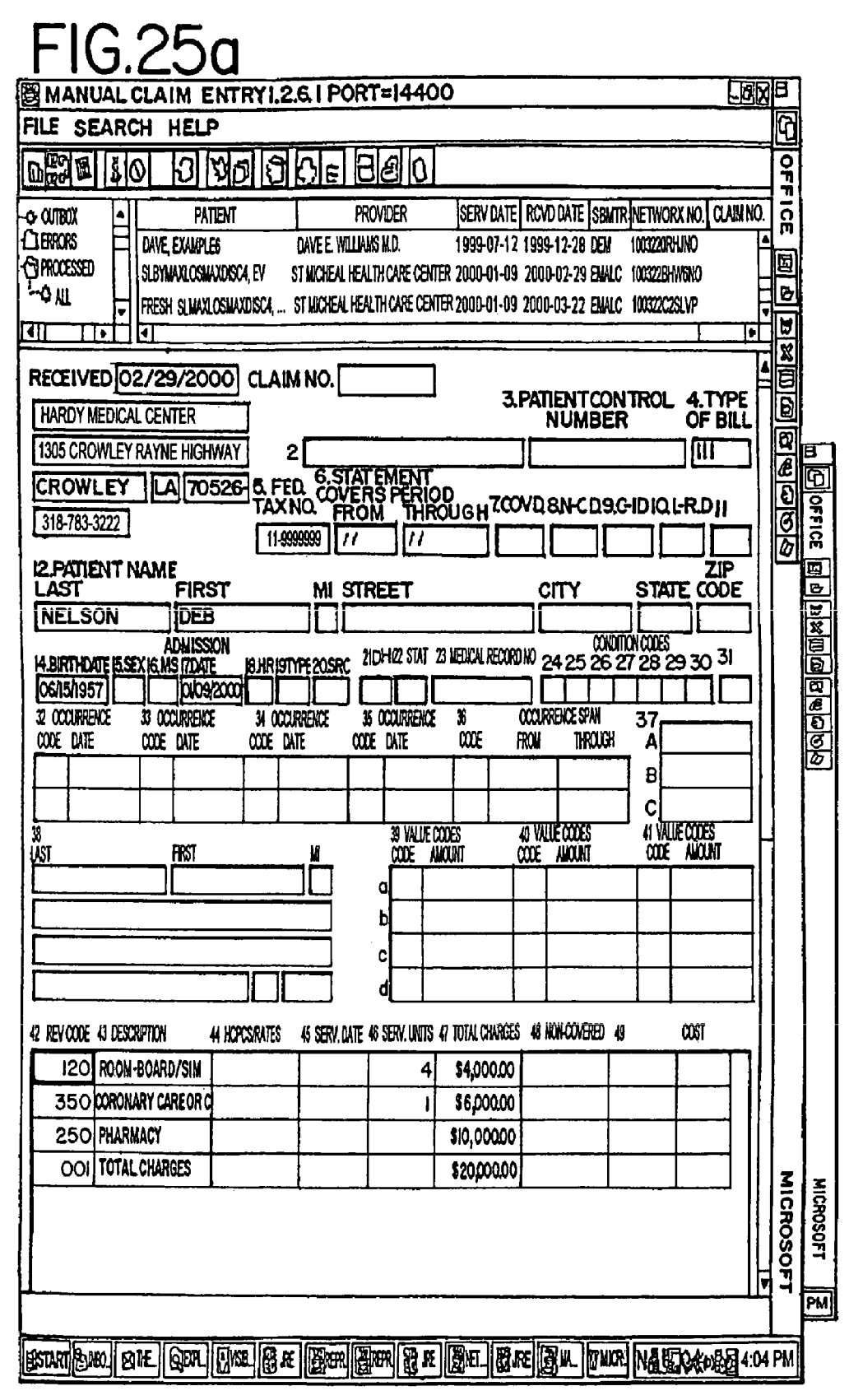

A second completed claim 310, illustrated in FIGS. 25a and 25b, is similar to completed claim 70 except it includes a Principal Procedure code '72' in code box 312, which designates a Normal Delivery. When repricing the second completed claim 310, the method, illustrated in FIG. 22, determining that the Case Rate section applies, step 256, would determine the type of service 260. Next in step 262, the repricing engine would reprice the entire claim under the Normal Delivery Calculations defined in the Rate Sheet 200, and reprice the claim to $2,300.00, illustrated in FIG. 26 in Repricing window 320.

The contracts platform permits virtually all contracts to be interactive, meaning that the information is shared and used between the contracts and between the other platforms and engines. This allows the platforms to be changed, customized or new platforms may be added without damaging the integrity of the shared or stored information. As such, as the industry or Insurer defines or re-defines the calculation categories or sections, the platforms may be changed or altered accordingly without damaging or effecting the information.

I. Additional Embodiments of the Present Invention

Figure 27:
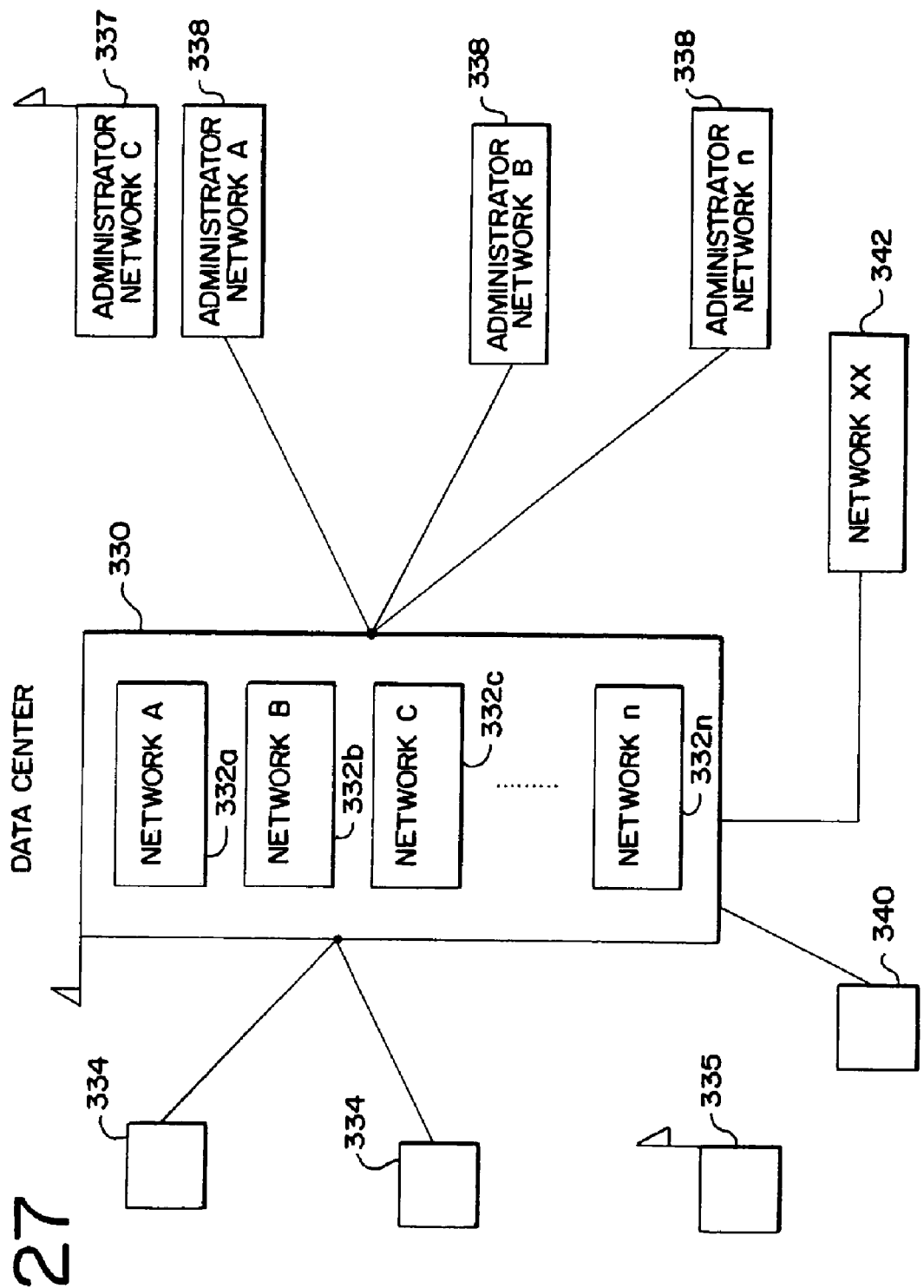
FIG. 27 is a block diagram illustrating an embodiment managing and maintain various networks on a data center that contain rate sheets for repricing claims.

As mentioned above, the platforms may be designed to accept claims over various communication mediums. If utilized by third party administrators or by employers, the ability to maintain a database to accept and reprice claims may be difficult, time consuming and expensive. As such, the need exists to provide a single data center maintaining and managing numerous networks. Referring to FIG. 27, a single data center 330 is shown with a plurality of networks stored thereon, network A 332 corresponding to Insurer A; network B 332b corresponding to employer B; network C network 332c corresponding to PPO C; ... ; network N 332n corresponding to Insurer n. Each network contains a plurality of rate sheets privy to the owner of the network, such as a PPO, Insurer, employer, or third party administrator. Various providers would submit reimbursement claims to the data center 330 over various wire line 334 and wireless 335 communication mediums. The data center would determine which network the claim is associated to and then reprice the claim and graphically display, transmit or electronically send to the submitter a reimbursement worksheet, such as the graphically displayed reimbursement window 300, FIG. 24.

The data center is also accessible by the network's administrators, through various wireline 338 or wireless 339 communication mediums. The network's administrators would access their networks and receive the submitted reimbursement claims along with corresponding reimbursement worksheet so that payments to the submitter may be made. Other outside networks 342, such as Network XX, may be maintained and managed outside of the data center by the outside network's administrators. However, through various links the data center may be provided with access to the outside network 342. This would permit a provider 334 to submit a claim, to be reimbursed against the outside network 342. The data center receiving the claim would access the outside network 342 and reprice the claim against the rate sheets contained thereon. In this instance any proprietary information in relation to the rate sheets is maintained by the administrator of Network XX.

Moreover, the data center may be accessible to patients 340 through various mediums. Patients with submitted claims may be able to track the repayment or the repricing of claims submitted on their behalf. The data center may further be capable of maintaining cost histories of providers and PPOs. Insurers attempting to maintain, negotiate and create new networks of PPOs may be able to access these histories to determine possible risk allocation levels and to locate specific PPOs that meet their qualifications.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A computer-readable storage medium storing computer readable instructions thereon that, when executed by a computer, direct the computer to execute a method of a reimbursement platform, the method comprising:

generating a user interface providing a phrase describing a term of a contract for reimbursement, wherein said phrase includes at least one input field for receiving input from a user; and generating information, stored to computer-readable medium, representing said term of said contract for reimbursement based at least in part on information input to said at least one input field.

2. The computer-readable storage medium of claim 1, wherein said contract for reimbursement is a contract for reimbursement by an insurer.

3. The computer-readable storage medium of claim 1, wherein said phrase includes at least one sentence.

4. The computer-readable storage medium of claim 1, wherein upon input to said at least one input field, said phrase forms at least one complete sentence.

5. The computer-readable storage medium of claim 1, wherein said at least one input field includes a drop-down menu providing a plurality of choices for selection of input to such field.

6. The computer-readable storage medium of claim 1, wherein generating information representing said term of said reimbursement contract comprises:

associating, with said term, information, stored to computer-readable medium, representing at least one qualifier having a corresponding calculation method, wherein the at least one qualifier identifies at least one condition to be satisfied by a claim for reimbursement in order to trigger the corresponding calculation method.

7. The computer-readable storage medium of claim 6, wherein said at least one input field receives information corresponding to at least one of the group consisting of: said at least one qualifier and said calculation method.

8. The computer-readable storage medium of claim 1, the method further comprising:

generating output presenting at least one phrase describing terms of the contract for reimbursement.

9. A computer-readable storage medium storing computer readable instructions thereon that, when executed by a computer, direct the computer to execute a method of a reimbursement platform, the method comprising:
- defining terms of a contract for reimbursement by an insurer; and
- generating output presenting at least one phrase describing the terms of the defined contract for reimbursement.

10. The computer-readable storage medium of claim 9, wherein defining said terms of said contract comprises:
- associating, with each of the terms, a qualification having a corresponding calculation method, wherein the qualification identifies when a received claim for reimbursement qualifies for reimbursement, under the term with which the qualification is associated, according to the corresponding calculation method.

11. The computer-readable storage medium of claim 9, wherein generating output comprises:
- generating output presenting said at least one phrase, wherein said at least one phrase includes at least one sentence.

12. A method for generating an electronic representation of a reimbursement contract, the method comprising:
- receiving, by a processor-based device, input identifying at least one term of said reimbursement contract;
- for each of the at least one term, receiving, by said processor-based device, input identifying at least one qualification that specifies at least one condition to be satisfied in a claim for the claim to qualify for reimbursement according to the corresponding contract term; and
- for each of the at least one qualification, receiving, by said processor-based device, input identifying a corresponding calculation method.

13. The method of claim 12, further comprising:
- said processor-based device representing each of said at least one term of said reimbursement contract by storing to a computer-readable medium the corresponding at least one qualification for each of the at least one term.

14. A method for determining a reimbursement amount for a claim, comprising:
- defining a reimbursement contract in computer-executable program code stored to a computer-readable medium, where said reimbursement contract includes information associating at least one term of the contract with at least one qualifier having a corresponding calculation method;
- receiving into a processor-based device, information about a claim received for reimbursement; and
- said processor-based device determining a reimbursement amount for the claim based at least in part on said reimbursement contract.

15. The method of claim 14, wherein said reimbursement contract comprises a contract between an insurer and a service provider.

16. The method of claim 14, wherein said claim for reimbursement is a claim by a medical service provider for reimbursement from an insurer for medical services rendered.

* * * * *